（12）United States Patent
Karthikeyan et al.

(10) Patent No.: US 10,965,614 B2
(45) Date of Patent: Mar. 30, 2021

(54) NEGOTIATING QUALITY OF SERVICE FOR DATA FLOWS

(71) Applicant: BRITISH TELECOMMUNICATIONS PUBLIC LIMITED COMPANY, London (GB)

(72) Inventors: Vidhyalakshmi Karthikeyan, London (GB); Detlef Nauck, London (GB)

(73) Assignee: BRITISH TELECOMMUNICATIONS, public limited company, London (GB)

( * ) Notice: Subject to any disclaimer, the term of this patent is extended or adjusted under 35 U.S.C. 154(b) by 159 days.

(21) Appl. No.: 15/740,607

(22) PCT Filed: Jun. 30, 2016

(86) PCT No.: PCT/EP2016/065436
§ 371 (c)(1),
(2) Date: Dec. 28, 2017

(87) PCT Pub. No.: WO2017/001634
PCT Pub. Date: Jan. 5, 2017

(65) Prior Publication Data
US 2018/0198732 A1 Jul. 12, 2018

(30) Foreign Application Priority Data

Jun. 30, 2015 (EP) .................................... 15275166
Sep. 28, 2015 (EP) .................................... 15187163
(Continued)

(51) Int. Cl.
*H04L 12/927* (2013.01)
*H04L 29/08* (2006.01)
(Continued)

(52) U.S. Cl.
CPC .......... *H04L 47/805* (2013.01); *H04L 45/302* (2013.01); *H04L 47/24* (2013.01);
(Continued)

(58) Field of Classification Search
None
See application file for complete search history.

(56) References Cited

U.S. PATENT DOCUMENTS 6,154,778 A 11/2000 Koistinen et al.
6,631,135 B1 10/2003 Wojcik
(Continued)

FOREIGN PATENT DOCUMENTS

EP 1 016 261 7/2000
EP 1 374 486 1/2004
(Continued)

OTHER PUBLICATIONS

International Search Report and Written Opinion of the International Searching Authority dated Sep. 6, 2016 issued in International Application No. PCT/EP2016/065436 (13 pgs.).
(Continued)

*Primary Examiner* — Hassan A Phillips
*Assistant Examiner* — Gautam Sharma
(74) *Attorney, Agent, or Firm* — Nixon & Vanderhye PC

(57) ABSTRACT

A method of allocating resources in a network for the transmission of a data flow is disclosed. The method involves receiving a query specifying one or more quality-of-service (QoS) requirements for the data flow and identifying, based on the specified QoS requirements, one or more QoS models from a set of stored QoS models, each QoS model defining a class of service available in the network. A query response specifying the identified QoS models is transmitted. Subsequently, a reservation request is received specifying at least one of the identified QoS models.
(Continued)

Resources are allocated in the network for the data flow based on the at least one QoS model specified in the reservation request.

21 Claims, 7 Drawing Sheets

(30) Foreign Application Priority Data

| Sep. 30, 2015 | (EP) | .................................... 15187813 |
|---|---|---|
| Mar. 24, 2016 | (EP) | .................................... 16162446 |

(51) Int. Cl.

| H04L 12/851 | (2013.01) |
|---|---|
| H04L 12/725 | (2013.01) |
| H04L 12/913 | (2013.01) |

(52) U.S. Cl.
  CPC ........ *H04L 47/2441* (2013.01); *H04L 47/724* (2013.01); *H04L 67/322* (2013.01); *H04L 67/306* (2013.01)

(56) References Cited

U.S. PATENT DOCUMENTS

| 6,690,929 | B1 | 2/2004 | Yeh |
| 7,668,946 | B1 | 2/2010 | Garcia-Franco et al. |
| 7,715,312 | B2 | 5/2010 | Khasnabishi |
| 8,073,455 | B1 | 12/2011 | Xie et al. |
| 8,797,867 | B1 | 8/2014 | Chen et al. |
| 2001/0013067 | A1 | 8/2001 | Koyanagi et al. |
| 2002/0174227 | A1 | 11/2002 | Hartsell |
| 2003/0112762 | A1 | 6/2003 | Hasan Mahmoud et al. |
| 2003/0144822 | A1* | 7/2003 | Peh .................... G06F 17/509 703/1 |
| 2004/0120705 | A1 | 6/2004 | Friskney et al. |
| 2005/0083762 | A1 | 4/2005 | Rui et al. |
| 2005/0102414 | A1 | 5/2005 | Hares et al. |
| 2006/0039380 | A1* | 2/2006 | Cloonan ............... H04L 49/90 370/395.4 |
| 2006/0187817 | A1 | 8/2006 | Charzinski et al. |
| 2007/0195788 | A1* | 8/2007 | Vasamsetti ........... H04W 28/24 370/395.21 |
| 2007/0230363 | A1 | 10/2007 | Buskens et al. |
| 2007/0268827 | A1 | 11/2007 | Csaszar |
| 2008/0008091 | A1 | 1/2008 | Yumoto |
| 2008/0065318 | A1 | 3/2008 | Ho |
| 2008/0104251 | A1* | 5/2008 | Xu ...................... H04L 47/14 709/227 |
| 2008/0192632 | A1* | 8/2008 | Bader ................ H04L 47/2416 370/230.1 |
| 2008/0232247 | A1 | 9/2008 | Evans |
| 2009/0172170 | A1* | 7/2009 | Rey .................. H04L 29/06027 709/227 |
| 2009/0191858 | A1* | 7/2009 | Calisti .................. H04L 47/14 455/422.1 |
| 2009/0245130 | A1 | 10/2009 | Bing |
| 2010/0100525 | A1 | 4/2010 | Huang |
| 2010/0202456 | A1* | 8/2010 | Godor ................. H04L 47/805 370/392 |
| 2010/0214920 | A1 | 8/2010 | Tewani et al. |
| 2010/0265826 | A1 | 10/2010 | Khasnabishi |
| 2011/0087522 | A1 | 4/2011 | Beaty et al. |
| 2013/0144550 | A1 | 6/2013 | Czompo |
| 2013/0275567 | A1 | 10/2013 | Karthikeyan et al. |
| 2013/0275589 | A1 | 10/2013 | Karthikeyan et al. |
| 2013/0311673 | A1 | 11/2013 | Karthikeyan |
| 2014/0046880 | A1 | 2/2014 | Breckenridge |
| 2014/0052850 | A1 | 2/2014 | Doorhy et al. |
| 2015/0098338 | A1 | 4/2015 | Bhattacharya |
| 2015/0332155 | A1 | 11/2015 | Mermoud |
| 2015/0381648 | A1 | 12/2015 | Mathis |
| 2016/0171398 | A1 | 6/2016 | Eder |
| 2016/0344604 | A1 | 11/2016 | Raleigh |
| 2018/0191606 | A1 | 7/2018 | Karthikeyan et al. |
| 2018/0191621 | A1 | 7/2018 | Karthikeyan et al. |
| 2018/0191635 | A1 | 7/2018 | Karthikeyan et al. |

FOREIGN PATENT DOCUMENTS

| EP | 1 401 161 | 3/2004 |
| EP | 1 453 256 | 8/2005 |
| EP | 1 248 431 | 10/2007 |
| EP | 1 858 210 A1 | 11/2007 |
| EP | 1 993 231 | 11/2008 |
| EP | 2 151 951 | 2/2010 |
| EP | 2 261 811 | 12/2010 |
| EP | 2 469 756 | 6/2012 |
| EP | 1 875 693 | 8/2012 |
| WO | 99/14931 | 3/1999 |
| WO | 01/65779 A2 | 9/2001 |
| WO | 02/080458 A1 | 10/2002 |
| WO | 2006/116308 | 11/2006 |
| WO | 2007/082918 A1 | 7/2007 |
| WO | 2011/076282 | 6/2011 |
| WO | 2012/085520 | 6/2012 |
| WO | 2012/085521 | 6/2012 |
| WO | 2013/059683 A1 | 4/2013 |
| WO | 2013/144550 | 10/2013 |
| WO | 2014/068268 | 5/2014 |
| WO | 2014/068270 | 5/2014 |
| WO | 2017/001628 | 1/2017 |
| WO | 2017/001629 | 1/2017 |

OTHER PUBLICATIONS

Search Report dated Nov. 15, 2016 issued in GB1605187.2 (6 pgs.).
Jari Koistinen and Aparna Seetharaman, "Worth-Based Multi-Category Quality-of-Service Negotiation in Distributed Object Infrastructures", Hewlett-Packard Laboratories, Jul. 1998 (11 pgs.).
Zoubir Mammeri, "Principles and Mechanisms for Quality of Service in Networks", Chapter 2, Published Feb. 2, 2010 (33 pgs.).
Office Action dated Mar. 4, 2020 issued in U.S. Appl. No. 15/740,520 (19 pgs.).
Office Action dated Nov. 13, 2019 issued in U.S. Appl. No. 15/740,832 (12 pgs.).
Office Action dated Nov. 13, 2019 issued in U.S. Appl. No. 15/740,837 (11 pgs.).
Advisory Action dated Oct. 8, 2019, issued in U.S. Appl. No. 15/740,520 (3 pages).
U.S. Appl. No. 15/740,832, filed Dec. 29, 2017 (29 pages).
International Search Report and Written Opinion issued in PCT/EP2016/065434 dated Oct. 6, 2016 (15 pages).
Valikannu "A Novel Energy Consumption Model using Residual Energy Based Mobile Agent Selection Scheme (REMA) in MANETs", 2015 2$^{nd}$ International Conference on Signal Processing and Integrated Networks (SPIN), Noida, India. Pub., IEEE, Feb. 19-20, 2015 (6 pages).
GB Search Report issued in GB1517349.5, dated May 26, 2016 (6 pages).
Balaraman, "Business Data Mining and Decision Making Application of Data Mining in the Telecommunication Industry" Term paper, Quantitative Methods & Information Systems, Indian Institute of Management Bangalore, Oct. 22, 2011 (23 pages).
Search Report dated Apr. 28, 2016 issued in GB1517110.1 (7 pages).
International Search Report and Written Opinion of the International Searching Authority dated Sep. 23, 2016, issued in International Application No. PCT/EP2016/065431 (15 pages).
U.S. Appl. No. 15/740,837, filed Dec. 29, 2017 (33 pages).
Extended European Search Report dated Nov. 26, 2015 issued in European Application No. 15275166.5 (5 pages).
International Search Report and Written Opinion of the International Searching Authority dated Sep. 5, 2016 issued in International Application No. PCT/EP2016/065429 (16 pages).
Tanja Zseby and Sebastian Zander, "Sampling Schemes for Validating Service Level Agreements", Centre for Advanced Internet Architectures, CAIA Technical Report 040706A, Jul. 2004 (6 pages).

(56) References Cited

OTHER PUBLICATIONS

Zhengdong Gao and Gengfeng Wu, "Combining QoS-based Service Selection with Performance Prediction", School of Computer Engineering and Science, Shanghai University, Proceedings of the 2005 IEEE International Conference on e-Business Engineering (ICEBE'05); 2005 (4 pages).
U.S. Appl. No. 15/740,520, filed Dec. 28, 2017 (29 pages).
European Office Action dated May 20, 2019, issued in EP No. 16 733 095.0 (9 pages).
Office Action dated Apr. 19, 2019 issued in U.S. Appl. No. 15/740,837 (14 pages).
Office Action dated Oct. 17, 2018 issued in U.S. Appl. No. 15/740,837 (11 pages).
Advisory Action dated Aug. 2, 2019 issued in U.S. Appl. No. 15/740,837 (4 pages).
Office Action dated Apr. 19, 2019 issued in U.S. Appl. No. 15/740,832 (12 pages).
Office Action dated Oct. 17, 2018 issued in U.S. Appl. No. 15/740,832 (11 pages).
Office Action dated Nov. 2, 2018 issued in U.S. Appl. No. 15/740,520 (13 pages).
Office Action dated May 30, 2019 issued in U.S. Appl. No. 15/740,520 (16 pages).
Examination Report issued in EP Application No. 16 733 597.5 dated Sep. 12, 2019 (9 pages).
Ananya DAS "Maximizing Profit Using SLA-Aware Provisioning", 2012 IEEE Network Operations and Management Symposium (NOMS), Math & Computer Science Department, Lake Forest College, Apr. 16, 2012 (8 pages).
Gerald Ash: "Recommendation E.QSC OEB_AMP#8211; Signaling of Proposed QOS Service Classes for IP-, ATM-, OEB_AMPamp; TDM-Based Multiservice Networks; TD 24 E", ITU-T Draft Study Period 2001-2004, International Telecommunication Union, Geneva; CH, vol. Study Group 2, May 7, 2002 (May 7, 2002), pp. 1-38, XP017420255.
Examination Report dated Dec. 18, 2020, issued in EP Application No. 16733095.0 (12 pages).

* cited by examiner

| Prototype Vector | Jitter | Loss | Delay |
|---|---|---|---|
| $p_1$ | 3.01 | 0.1506 | 24.82 |
| $p_2$ | 4.00 | 0.1003 | 29.76 |
| $p_3$ | 2.50 | 0.1995 | 19.90 |

Fig. 2A

| Confidence Vector | Jitter | Loss | Delay |
|---|---|---|---|
| $c_1$ | 0.0280 | 0.0015 | 0.2193 |
| $c_2$ | 0.0395 | 0.0008 | 0.2235 |
| $c_3$ | 0.0211 | 0.0017 | 0.1905 |

Fig. 2B

| Base Data | | | | Global Statistics | | | | |
|---|---|---|---|---|---|---|---|---|
| ID | Prototype | Global Confidence | Created | Capacity [Mb/s] | Routes | Peak Flows | Peak Demand [Mb/s] | 1hr Flows | ... |
| 1 | (3.1, 0.1521, 25.15) | (0.0280, 0.0015, 0.2193) | 20/03/2014 12:00 | 200 | 3 | 24 | 153 | 13 | ... |
| 2 | (4.00, 0.1003, 29.76) | (0.0395, 0.0008, 0.2235) | 20/03/2014 14:00 | 150 | 3 | 0 | 0 | 0 | ... |
| 3 | (2.50, 0.1995, 19.90) | (0.0211, 0.0017, 0.1905) | 20/03/2014 14:00 | 300 | 3 | 0 | 0 | 0 | ... |
| ... | ... | ... | ... | | ... | ... | ... | ... | ... |

Fig. 2C

| Base Data | | | | | Route-based Statistics | | |
|---|---|---|---|---|---|---|---|
| Route | Model ID | Route Confidence | Active since | Capacity [Mb/s] | Peak Flows | Peak Demand [Mb/s] | ... |
| 1 | 1 | (0.0280, 0.0015, 0.2193) | 20/03/2014 12:00 | 100 | 8 | 82 | |
| 2 | 1 | (0.0280, 0.0015, 0.2193) | 20/03/2014 12:00 | 50 | 9 | 48 | |
| 3 | 1 | (0.0280, 0.0015, 0.2193) | 20/03/2014 12:00 | 50 | 7 | 23 | |
| 4 | 2 | (0.0395, 0.0008, 0.2235) | 20/03/2014 14:00 | 200 | 0 | 0 | ... |
| ... | ... | ... | ... | | ... | ... | ... |
| 9 | 3 | (0.0211, 0.0017, 0.1905) | 20/03/2014 14:00 | 100 | 0 | 0 | ... |
| ... | ... | ... | ... | | ... | ... | ... |

Fig. 2D

| Model ID | Jitter | Loss | Delay | Resilience | Energy | Load distribution | Cost | Src. | Dst. | Throughput (Mbps) |
|---|---|---|---|---|---|---|---|---|---|---|
| M1* | ✓ | ✓ | ✓ | ✗ | ✗ | ✗ | ✗ | C1 | C2 | 50 |
| M2 | ✗ | ✓ | ✗ | ✗ | ✓ | ✗ | ✗ | C3 | C4 | 5 |
| M3 | ✓ | ✓ | ✓ | ✓ | ✗ | ✓ | ✗ | C1 | C4 | 10 |
| M4* | ✗ | ✗ | ✗ | ✗ | ✓ | ✗ | ✗ | C1 | C2 | 60 |
| M5* | ✗ | ✗ | ✗ | ✗ | ✗ | ✗ | ✓ | C1 | C2 | 70 |

NEGOTIATING QUALITY OF SERVICE FOR DATA FLOWS

This application is the U.S. national phase of International Application No. PCT/EP2016/065436 filed 30 Jun. 2016, which designated the U.S. and claims priority to EP Patent Application No. 15275166.5 filed 30 Jun. 2015, EP Patent Application No. 15187163.9 filed 28 Sep. 2015, EP Patent Application No. 15187813.9 filed 30 Sep. 2015, and EP Patent Application No. 16162446.5 filed 24 Mar. 2016, the entire contents of each of which are hereby incorporated by reference.

BACKGROUND AND SUMMARY

The present invention relates to transmission of data flows over computer networks with agreed Quality of Service (QoS) characteristics.

As the volume of traffic transmitted on packet switched networks has increased, and the types of traffic transmitted over such networks has broadened to include traffic types that rely upon low latency transmission over the network, such as voice or streaming media, it has become increasingly important to enable proactive management of the traffic on the network.

Various approaches have been developed to enable differentiated handling of different types of network traffic. The Integrated Services, IntServ, architecture is designed to guarantee a particular quality of service for the transmission of a stream of packets across a network. Prior to transmission of a stream of packets, IntServ requires that an originating network component reserves resources in each router through which the stream of packets will pass. This resource reservation, usually requested using RSVP (Resource Reservation Protocol), ensures that each router in the path has the necessary resources to guarantee transmission of the packet stream at a particular QoS prior to transmission of the packet stream. However, the IntServ system does not scale easily, since it quickly becomes difficult for the network components to manage the reservations.

An alternative approach is the Differentiated Services, DiffServ, architecture, which enables the network to classify the traffic into one of a specified and predetermined (and usually quite small) number of traffic classes. A differentiated services, DS, field is populated in each packet transmitted across the network and the field indicates to the network the quality of service, QoS, that is to be provided to that packet in its transmission between network components. The DiffServ model can be used to provide low-latency transmission of critical network traffic, such as streaming packets or voice-over-IP packets, across a network. Packets not marked with a prioritised packet code, such as email and web traffic, can be transmitted when the network components have capacity to do so (so-called "best-effort" traffic). However, the limitation to a small set of predefined classes of service generally limits flexibility for network clients transmitting data flows over the network, and also means that available network resources may not always be utilised efficiently.

In a first aspect of the invention, there is provided a method of allocating resources in a network for the transmission of a data flow, comprising: receiving a query specifying one or more quality-of-service (QoS) requirements for the data flow; identifying, based on the specified QoS requirements, one or more QoS models from a set of stored QoS models, each QoS model defining a class of service available in the network; transmitting, in response to the query, a query response specifying the identified QoS models; receiving a reservation request, the reservation request specifying at least one of the identified QoS models; and allocating one or more resources in the network for the data flow based on the at least one QoS model specified in the reservation request.

QoS models generally define classes of service available in the network. Such classes of service may be considered "available" (for example) in the sense that they have been preconfigured (e.g. by the network operator) or have been determined to be supportable by available network resources based on measurement of network performance. Resources may be physical or logical. Allocation of resources typically involves assignment of one or more routes, or bandwidth on one or more routes, where routes may directly represent physical connections or may represent logical connections such as tunnels or label-switched paths (LSPs). However, other types of logical resources may be allocated in the allocation step; for example, a given class of service (CoS) that is determined based on the reservation request for allocation to the data flow may itself be considered a "resource" that is allocated.

Preferably, each QoS model specifies a set of one or more QoS features defining data flow characteristics associated with the model. QoS features (or data flow characteristics) may concern any measurable, quantifiable or classifiable characteristic relating to the transmission of data in the network, including measures of data transmission performance, measures relating to cost or energy consumption, and the like.

Identifying one or more QoS models may comprise comparing the received QoS requirements to QoS features of stored QoS models, and selecting one or more QoS models based on the comparison. Preferably, the identifying step comprises selecting at least one QoS model having QoS features meeting at least one of (optionally several or all of) the QoS requirements. When reference is made herein to a QoS model "meeting", "supporting" or being "compliant" with a requirement (or similar language), this may be taken to mean that the QoS model defines a performance level for a given feature that meets or exceeds a performance level specified by a corresponding QoS requirement. This may for example be determined by numerical comparison of feature metrics, though the specifics may depend on the numerical or other data representation of the given feature metric. A similar interpretation applies where reference is made to a route "complying" with or "supporting" a QoS model or QoS model feature, or similar language.

The query may specify one or both of: a first set of one or more QoS requirements indicated as mandatory for the data flow; and a second set of one or more QoS requirements indicated as desirable but non-mandatory. The method then preferably comprises selecting one or more of the stored QoS models that are compliant at least with each of the specified mandatory QoS requirements (and optionally also compliant with one or more non-mandatory QoS requirements).

The query response preferably specifies for each selected QoS model the QoS feature(s) associated with the selected QoS model, e.g. by specifying QoS metrics for those features (where metrics may be specified as specific values, or value bounds/bands). The response may further specify for at least one QoS model a set of selectable QoS bands within the QoS model, each QoS band preferably defined by a bounded value range or limit for a QoS feature metric.

After transmitting the query response, the method may involve receiving one or more further queries including modified QoS requirements in relation to the data flow, and repeating the identifying and transmitting steps for the or each further query.

Allocating resources may comprises allocating a class of service to the data flow, the class of service associated with a set of one or more QoS features selected in dependence on the QoS features of the QoS models specified in the reservation request. The allocated class of service may correspond to one of the specified QoS models or a combination of a plurality of the specified QoS models (e.g. by combining some or all QoS features taken from respective QoS models).

The method may comprise generating a class of service identifier identifying a class of service for the data flow, the class of service identifier optionally comprising a Differentiated Services Code Point, DSCP, value, and preferably including the class of service identifier in a reservation response.

Allocating resources preferably comprises selecting for transmission of the data flow at least one network route supporting data transmission in accordance with one or more of the QoS models specified in the reservation request. The reservation request may specify a constraint on at least one QoS feature of a given QoS model; the allocating step further comprising selecting at least one route supporting the given QoS model within the specified constraint (in other words, a route is selected that offers performance required by the QoS model that also meets the constraint). Thus, the selected QoS model may be further parameterised to limit the selected routes to a subset of the routes that support the QoS model. The constraint may comprise a QoS band within the given QoS model and/or the constraint may be specified as an upper and/or lower bound on a QoS feature metric.

The reservation request may specify a single QoS model, with resources (e.g. a route) allocated to meet the QoS level specified by that model. Alternatively, the reservation request may specify a plurality of selected QoS models, in which case the reservation request may further include priority information indicating respective priorities for one or more of the selected QoS models. The priority information may indicate a priority order for the specified QoS models (or at least for some of them).

The method may then comprise allocating resources based on the selected QoS models in accordance with the priority information.

Allocating resources preferably comprises selecting one or more network routes based on the priority information. The selecting may include one or more of: selecting routes complying with a greater number of the specified QoS models in preference to routes complying with fewer of the QoS models; selecting routes compliant with (a) higher priority QoS model(s) in preference to routes compliant with (a) lower priority QoS model(s); selecting routes compliant with at least a predetermined minimum number of QoS models (or a predetermined minimum number of highest-priority QoS models); not selecting a route that does not comply with a highest priority one of the specified QoS models. The method preferably further comprises allocating at least one selected route for transmission of the data flow.

The method may comprise: accessing information for a first available route, the first available route determined in accordance with an ordering based on compliance of routes with a given one (preferably a highest-priority one) of the specified QoS models; and evaluating compliance of the identified route with one or more other specified QoS models (e.g. against a compliance criterion), optionally in accordance with priority information. The method then preferably further comprises one of: if the identified route meets the compliance criterion, selecting the route for allocation to the data flow or as a candidate for allocation; and if the identified route does not meet the compliance criterion, accessing a next available route in accordance with the ordering; and repeating the evaluating step for the next available route. The compliance criterion may indicate a minimal compliance required for the remaining QoS models.

The method may comprise, after receipt of the reservation request, modifying the set of QoS models specified in the request, the allocating step performed based on the modified set of QoS models. This may allow a network operator to influence the considerations and priorities that are applied when allocated resources for a data flow. For example, the modifying may comprise one or more of: modifying priorities assigned to one or more of the specified QoS models; adding a QoS model, optionally with associated priority information, to the set of specified QoS models; and removing a specified QoS model.

The allocating step preferably comprises identifying one or more network routes for transmission of the data flow, and may further comprise allocating a portion of bandwidth on the identified route(s) to the data flow. The method may comprise: allocating a first route for the data flow based on one or more QoS models specified in the reservation request; determining an available bandwidth of the first route; determining a bandwidth requirement for the reservation request; and in response to determining that the available bandwidth is less than the bandwidth requirement, allocating at least one further route for the data flow based on the one or more QoS models specified in the reservation request.

The method may comprise configuring the network or at least one component associated with the network to perform load sharing across a plurality of the identified routes when transporting the data flow.

The method may further comprise transmitting a response to the reservation request, the response including an indication of allocated resources and/or a class of service identifier for use in marking packets of the data flow.

Preferably, the method comprises receiving one or more packets associated with the data flow, and transmitting the packets through the network using the allocated resources and/or in accordance with a class of service assigned to the data flow. This may involve receiving one or more data packets including a class of service identifier allocated to the data flow, identifying using the class of service identifier one or both of: the QoS features selected for the data flow in response to the reservation request, and the resource(s) allocated to the data flow; and transmitting the packet(s) based on the identified QoS features and/or resources. The method may comprise load-balancing the data packets of the data flow across a plurality of routes allocated to the data flow.

The QoS models are preferably stored in a database of QoS models, and the database may include for each of a plurality of QoS models a mapping the respective QoS model to a set of one or more network routes supporting data transmission in accordance with the QoS model. The resource allocation may then comprise identifying routes supporting one or more specified QoS models using the stored mapping.

The QoS requirements specified in the query and/or QoS features specified in the QoS models preferably include one or more QoS metrics, the QoS metrics preferably comprising one or more of: packet delay; packet loss; packet jitter; cost associated with data transmission; energy consumption associated with data transmission; and failure resilience of a network route or portion via which a data flow is transmitted. Any other appropriate performance metrics or other metrics may be used.

The method is preferably performed at a first computer system (such as a gatekeeper, gateway server, or other suitable network component which may be used to manage or control access to the network). The query and reservation request are preferably received at the first computer system from a second computer system (such as a client system) and the query response and optionally a reservation response are sent from the first computer system to the second computer system. The method preferably further comprises, at the second computer system: receiving the query response; selecting one or more of the identified QoS models, and optionally generating priority information associated with the one or more selected QoS models; generating the reservation request specifying the selected QoS models and optionally the priority information; and transmitting the reservation request to the first computer system.

The invention also provides a computer readable medium comprising software code adapted, when executed on a data processing apparatus, to perform any method as set out herein.

The invention further provides a system or apparatus having means, preferably in the form of at least one processor and associated memory, for performing any method as set out herein. Such system/apparatus aspects of the invention may include a computer device configured (e.g. via software) to implement the methods set above. More particularly, devices respectively implementing the functionality of the gatekeeper and client system (described in detail below) may be provided as independent aspects of the invention. A further aspect of the invention provides a system incorporating both a client system and a gatekeeper system arranged to communicate with each other to implement QoS negotiation as set out above.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which:

FIGS. 2A and 2B give examples of QoS feature vectors and confidence vectors that may be used to define QoS models;

FIGS. 2C and 2D give examples of tables comprising QoS model information and model-to-route mapping information;

DETAILED DESCRIPTION OF PRESENT EXAMPLE EMBODIMENTS

Overview

Embodiments of the invention provide systems and methods for negotiating the class of service that is to be applied to a data flow carried across a network. The class of service is expressed in terms of one or more quality of service (QoS) models that are defined for a network and that may be parameterised and combined in a prioritized manner to determine the set of QoS features to be applied to the data flow.

Figure 1:
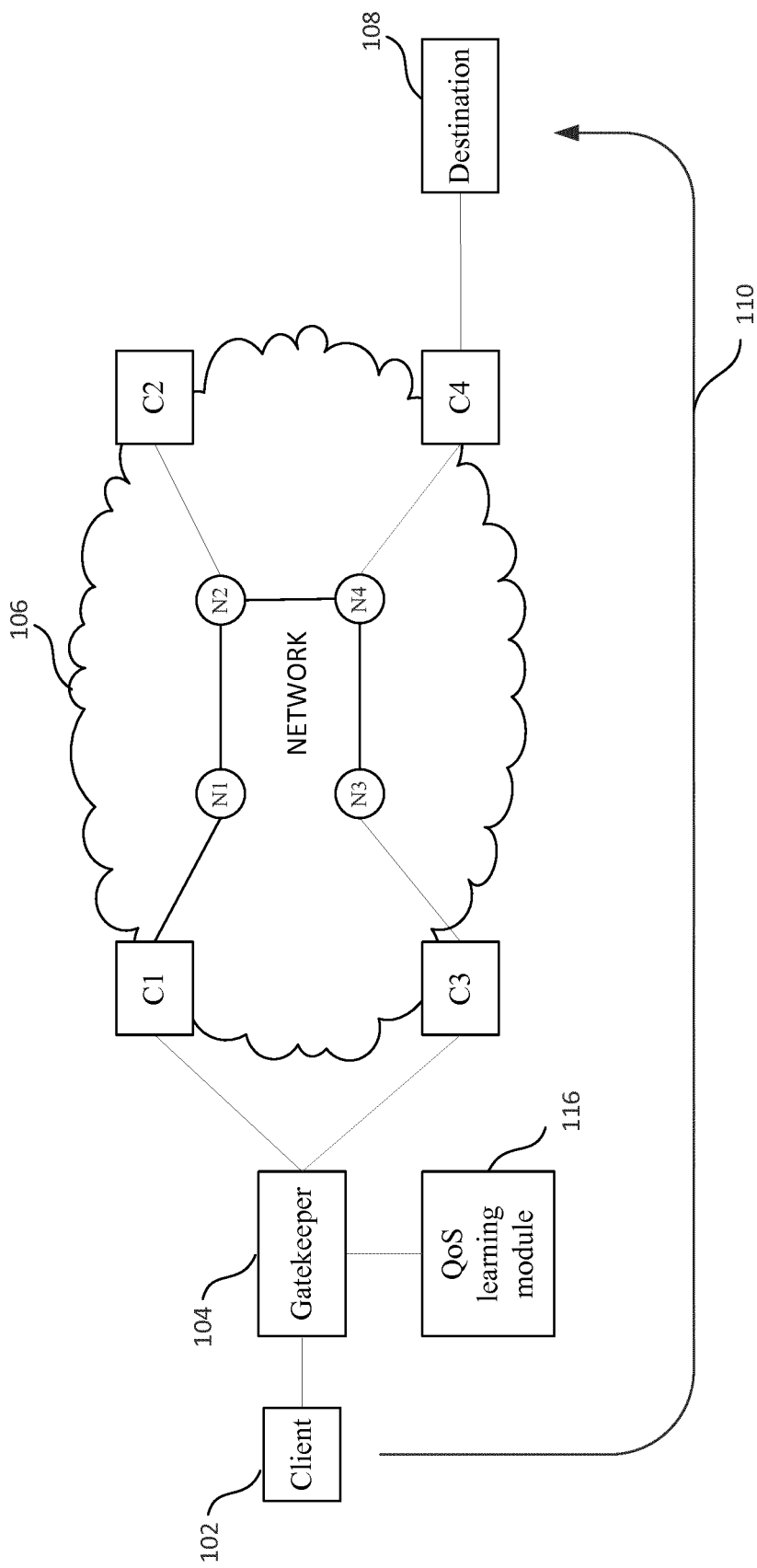
FIG. 1 illustrates a system for transmission of data flows across a network based on negotiated quality of service (QoS) metrics.

FIG. 1 illustrates a typical scenario in which a client 102 wishes to send a data flow to a given destination 108. The data flow is conceptually represented by arrow 110. Note that the terms "client" and "destination" are used merely to refer to the originator and recipient of the data flow respectively, such that the client is in the role of acquiring and consuming network resources from the network, and do not imply a client/server type relationship. For example, the client could be a media streaming system and the destination could be a user device such as a media player.

The data flow is to be carried across a network 106, which includes a number of interconnected edge nodes C1-C4 and internal nodes N1-N4 (the number of nodes and interconnections depicted are chosen purely for example purposes). The network can thus provide various routes between pairs of edge devices, which can carry data flows, such as C1-N1-N2-C2, C1-N1-N2-N4-C4 etc. Each of these routes may have different performance characteristics, for example in terms of packet loss or delay.

The network is configured to provide data transmission in accordance with various distinct Quality of Service (QoS) models. Each QoS model in effect defines a Class of Service (CoS) that may be applied to traffic transported on the network. QoS models define bounds on various QoS metrics, such as packet loss, packet delay and the like. For example, one QoS model may define a particular maximum value for packet loss whilst another may specify a maximum packet delay. A single model may also combine multiple QoS metrics. The individual QoS metrics for which a QoS model defines bounds or constraints are also referred to herein as features of the QoS model.

In a simple example, the available QoS models may be predefined and largely fixed. For example, the network may provide a standard set of DiffServ classes of service such as Default PHB (typically best-effort traffic), Expedited Forwarding (EF) PHB (low-loss, low-latency traffic) and Assured Forwarding (AF) PHB (where PHB denotes per-hop-behaviour).

Preferred embodiments of the invention operate in the context of a system which monitors performance characteristics of the network and dynamically identifies classes of service that the network can support. This is based on an iterative learning process, in which various metrics are measured for actual flows traversing the network. For example, a given flow may be associated with a performance metric vector $p=<m_1, m_2, \ldots m_n>$. Each metric corresponds to a different feature of the flow (e.g. packet latency, packet loss, jitter etc.)

A learning algorithm then performs a clustering analysis on the measured metric vectors to identify representative metric vectors that indicate distinct network behaviours (these are preferably the clustering centres produced by the clustering algorithm and are referred to as prototypes). The representative metric vectors or prototypes and their associated clusters then form the basis of a dynamic set of QoS models that can be made available for use. For example, if the clustering algorithm identifies a number of flows that achieve similar levels of packet loss and similar levels of packet latency, a QoS model can be defined specifying the given loss and latency levels (e.g. as bounded ranges, or just upper limits). This QoS model can be made available for use by future packet flows, since the system knows from the observed prior behaviour that the network can support traffic with those characteristics.

FIG. 2A illustrates a set of prototype feature vectors derived by the learning algorithm. Here, each prototype vector includes metrics for the "jitter", "loss" and "delay" features. The clustering algorithm may additionally generate information indicative of the spread of performance values across an identified cluster of which the prototype is representative, for example in terms of confidence intervals. FIG. 2B illustrates a set of 99% confidence intervals for the prototype vectors of FIG. 2A. Together, a prototype vector and associated confidence vector can be used to specify the performance characteristics of a given QoS model.

FIG. 2C illustrates an example of a data table maintained by the system listing details of QoS models including prototypes and confidence intervals (both shown as tuples of feature metric values), available data capacity for each model, along with various statistics for the models.

Each metric corresponds to a given feature of a traffic flow or of a QoS model. Clustering may be performed on any available number of features, so that the learnt QoS models may specify constraints on all features or on any subset of available features, leaving other features unspecified. The feature specification of a QoS model may be considered to constitute a form of Service Level Agreement (SLA), specifying the service level expected when transporting a data flow across the network.

The features and associated metrics can relate to any measurable quantities associated with the network and how traffic is carried across the network. This includes both "hard" performance metrics, such as packet loss, packet jitter and packet delay, as well "soft" metrics such as:
  energy consumption (e.g. an estimate of the energy consumed by carrying a packet or flow over a given route)
  a cost value representing a financial cost involved in transport of a packet or flow across a route
  resilience (e.g. an expected rate of failure along a route, for example due to hardware failures, routers crashing and the like)

Some metrics (especially "soft" metrics e.g. cost), may be represented as a set of value bands rather than as a continuum of values, which can enable derivation of more useful and representative QoS models.

When "learning" a QoS model, the system keeps a record of all routes that support the model (i.e. the routes carrying the observed data flows which were the basis for the model). Thus, in addition to the model definitions themselves, the learning process produces a mapping that maps QoS models to routes. An example of a table providing such a mapping is illustrated in FIG. 2D.

For example, a low packet loss QoS model may be associated with route C1-N1-N2-N4-C4 in the FIG. 1 network, whilst a low packet delay model may be associated with route C3-N3-N4-C4. Later, when routing a data flow tagged for a given Class of Service corresponding to one of the QoS models, the network (e.g. the gatekeeper) selects a route associated with that QoS model to carry the data flow.

Referring back to FIG. 1, the learning algorithm is implemented in a QoS learning module 116, which may be part of the gatekeeper 104 or my be implemented separately, e.g. in a dedicated server. In a preferred embodiment, the QoS learning module 116 continues to monitor data flows in the network, and repeats the described learning process at periodic intervals. As a result the set of available QoS models may evolve over time, adapting to resource availability and demand in the network. However, such a dynamic system can make it more difficult for clients wishing to reserve resources for data flows to know what performance characteristics can be supported by the network at any given time. Furthermore, it may be the case that no single QoS model accurately represents the service characteristics desired by the client at that time.

Embodiments of the present invention accordingly provide a system for negotiating the characteristics to be applied to a data flow, in terms of a set of available QoS models advertised by the network. Whilst of particular use in a dynamic QoS system as just described, the described approach is also applicable to networks implementing a set of fixed, predefined QoS models.

The negotiation occurs by interaction between the client 102 with the gatekeeper entity 104. The purpose of this interaction is to:
  Enable a client to query the network about currently available QoS models in the dynamic QoS environment
  Enable the network to respond with currently available QoS models, both performance-driven as well as relating to softer routing features, and communicate some of the properties associated with a given model
  Enable the client to query the response and/or respond with one or more QoS models it desires which can be a mixture of performance driven models as well as policy-based models
  Enable the network to establish an order of importance for each of those models
  Enable the network to determine the best possible route to the destination given the priorities communicated by the client
  Enable the network to mandate policies that are considered important and introduce priorities of its own in the choice of route In the proposed system the client and network exchange information and agree QoS characteristics for a data flow, without necessarily revealing all of their priorities to the other party. This essentially provides for a cloaked negotiation between the network and the client via the gatekeeper, where both the client and network can request and influence priorities in how the traffic should be routed.

The system enables the negotiation with or without a dynamic QoS environment, and provides the ability for a client to communicate a priority in features, i.e. QoS models, to influence routing behaviour for its traffic, with the network being able to understand these priorities as well as implement them in addition to its own priorities (a layered approach). The approach may be applied to QoS models expressed both in terms of concrete performance measures as well as in the context of softer routing features, as explained above. Thus, the QoS priorities can be both performance as well as policy related and routing is done in a way that trades off these priorities to find one or more suitable routes to carry a given data flow.

The described approach differs from the classic DiffServ model in a number of significant ways. Routing can be done optimising more than one priority, i.e. the client can ask for the behaviour offered by multiple CoS at the same time with a priority indicating importance of one CoS over another. For example, the client can ask for the traffic to be assured a specified {jitter, loss, delay} performance but at the same time have a route that is resilient to a specified degree. The client can alternatively ask for an energy-efficient pathway that does not cost more than X. The choices that the client has depend on the models on offer at that time from the network. It is, of course, conceivable that the network offers the same set of QoS models all the time (similar to classic DiffServ).

The client has the ability to negotiate a bespoke routing priority set, either periodically or on a per-session (or per-aggregate) basis, if this is feasible. The client also has the ability to query the models and find out, using remote intelligence if appropriate, if the model proposed suits other criteria without having to reveal what these criteria are. For example, a client can request a lowest cost model and query it for performance features including forecasted stability to determine remotely if the performance offered by the lowest cost model is sufficient for its traffic at the present time. The client will then take the lowest cost model which is optimised for cost but not for performance and nevertheless enjoy the desired performance if the network remains uncongested.

Similarly, the network operator also has more control over the QoS features offered to a client. In the described embodiments it is assumed that a network publishes all the QoS models it creates to its clients. The operator still retains control over which routes are used for which traffic, can manipulate QoS priorities received from the client and map requests onto the resources that the network desires or reject the session if the constraints placed by both client and network cannot be met. The network operator can also enforce additional priorities, should they wish, on top of the priorities requested by a client at a given time and find routes that best satisfy both parties in this exchange.

The network itself may handle traffic forwarding based e.g. on a classic DiffServ model or a dynamically derived set of QoS models as described above. Having a dynamic QoS environment increases the periodic refreshing of active QoS models and involves some management overhead. Clients can send reservation requests as they would to an admission controller. This can be on a session-by-session basis or requests can be aggregated into larger sessions to reduce frequency of admission requests. The interface between the clients and the networks has access to the required information to inform the clients of what QoS models (essentially representing 'bins' of traffic treatment) are available and this information is acquired not by engineering traffic in a certain way but by observing current traffic patterns, reinforcing them by sending similar traffic in the same manner and forecasting the stability of the model over time.

In a preferred embodiment, the system does not operate a per-session reservation in the network as per RSVP (Resource Reservation Protocol). Instead, the tunnels for carrying traffic across given routes are created in the network in advance (if at all, in the case of dynamic QoS) and are maintained for a longer duration than the frequency of arrival of traffic admission requests. Data flows are then assigned to the available routes or tunnels, based on the QoS available on those routes/tunnels and the QoS requested by the client.

This, the individual requests that could contain as much granularity in terms of QoS specification as desired by the client must be aggregated into the larger 'bins' of treatment by the network and this is the function that the network interface performs, represented in FIG. 1 by the gatekeeper 104. The network interface is also capable of multi-criteria optimization where a client can have more than one treatment of traffic (performance, resilience as well as cost, for example) and the gatekeeper performs this translation to specific routes, if possible. The gatekeeper can also invoke load balancing across routes, if necessary.

The QoS Negotiation Process

This section describes an example of a signalling exchange between a client and the gatekeeper to establish the Class of Service (CoS) to be applied to a data flow and hence which routing priorities must be implemented. The actions performed by the network to implement the routing priorities will be described in more detail in a later section.

Figure 3:
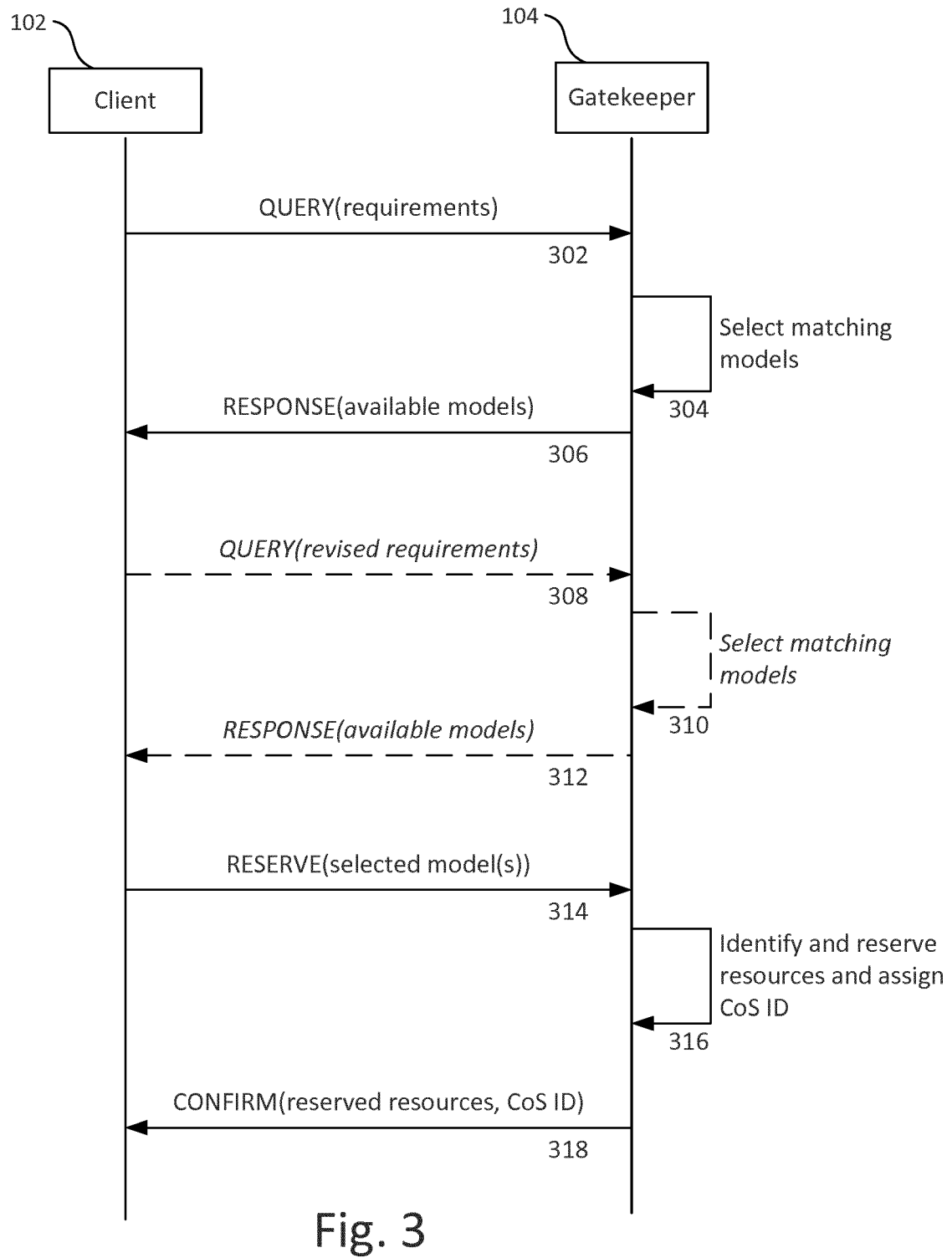
FIG. 3 illustrates a QoS negotiation process between a client and a gatekeeper.

A signalling exchange for the negotiation process is illustrated in overview in FIG. 3.

The exchange starts in step 302 with the client 102 sending a query to the gatekeeper 104, specifying one or more requirements for the data flow. The requirements are specified in terms of one or more QoS metrics. In step 304, the gatekeeper identifies QoS models matching the identified requirements, and provides information about the matching models in a response to the client (step 306). If required, the query and response may be repeated one or more times (steps 308, 310, 312), for example based on revised requirements. In step 314, the client sends a reservation message, identifying one or more of the available QoS models as the basis for a resource reservation. In step 316, the gatekeeper identifies and reserves (if possible) network resources for the data flow based on the selected QoS model(s). This may involve identifying suitable network routes and allocating bandwidth on those routes. The gatekeeper also allocates a distinct CoS identifier for the data flow, representing the negotiated QoS metrics and allocated resources. In step 318, the gatekeeper sends a response indicating the allocated resources and CoS identifier.

The CoS identifier (e.g. in the form of a DSCP as discussed below) is subsequently used by the client to label traffic for the data flow. The gatekeeper or another network component (e.g. edge router) receiving data packets for the flow labelled with the CoS identifier, can then identify the agreed QoS metrics and/or allocated resources for the packets from the CoS identifier and can process and route them accordingly.

The following sections describe various aspects of the negotiation process in more detail.

In a preferred embodiment, the CoS negotiation takes place at admission stage. Therefore, the following assumes that a reservation protocol is in use to send requests from a client (or their interface) to the network (or its gatekeeper). In one example, this protocol is NSIS, specifically QoS NSLP (as defined in Manner et al., "NSIS Signaling Layer Protocol (NSLP) for Quality-of-Service Signaling", IETF RFC 5974). GIST (General Internet Signaling Transport) is typically used as a transport mechanism for QoS NSLP. Note that whilst this protocol is employed in the present example to demonstrate the negotiation capability, the disclosed functionality could be implemented using other suitable protocols.

Note that in this approach the QoS NSLP messaging is only used between client and the gatekeeper and not to make reservations in the network beyond the gatekeeper entity. This is because the resources have already been organised in the network and there is no need for individual reservations. The gatekeeper performs the required translation between the specific client request and the generic network traffic treatment as defined in QoS models.

We use the QSPEC (QoS specification) object provided in QoS NSLP to communicate features about the various QoS models available. We assume in this example that the network operates in dynamic QoS mode where classic DiffServ has been extended to offer time-variant QoS models, some of which can also be softer routing models, as described previously.

In this context, a client can be any device or system requiring transmission of data over the network, for example, a single end device, a corporate customer's private network, a peering autonomous system or an intermediate content provider/carrier themselves.

Here we use the QUERY, RESPONSE, RESERVE message types in QoS NSLP with QoS Desired (henceforth QoS_D), QoS Available (henceforth QoS_A), Minimum QoS (henceforth min_QoS) and QoS Reserved (henceforth QoS_R) QSPEC objects with a number of parameters, some of which can be custom-defined by the QoS learning module. Note that it is not necessary to have all the objects specified below. The present description gives an example of one pattern of signalling that could be employed, but the signalling exchange could be implemented in any other appropriate way.

In the proposed approach, the QoS NSLP signalling is done locally and therefore any existing signalling using other signalling protocols can be encapsulated to be dealt with within the scope of the network where this system operates. The method of doing this is explained in Section 4.1 of RFC 5975.

The QUERY Message

The client sends a QoS NSLP QUERY message with the QoS_D, QoS_A and min_QoS objects.

The client (Initiator) specifies what their desired traffic treatment parameters should be using the QoS_D object. The <TMOD1> parameter that is included in the Initiator QSPEC specifies some basic features that the traffic would like. This would be (for example) data rate (bandwidth), bucket size, peak rate, minimum policed unit and maximum packet size. Such features may be features which are set as basic requirements for the data flow but which are not modelled as features of QoS models. In that case, the gatekeeper determines whether these can be supported (rejecting the request if not) but does not make these part of the subsequent QoS negotiation. Alternatively, some or all of these features could be part of the QoS models and negotiation process. The choice of which traffic features are configured separately from the QoS negotiation process and which are modelled and negotiated via the QoS models may be implementation-dependent.

The client also provides a QoS_A object to request what QoS models are currently on offer. This object could contain one pre-defined custom parameter that triggers the gatekeeper to respond with a list of current available QoS models.

The min_QoS object can be included to specify the absolute minimum thresholds of traffic treatment that the client expects—any treatment below this threshold would be unacceptable for the client and should not be admitted.

Using the initial QUERY message, the network can filter out QoS models that do not conform to these basic requirements specified in the min_QoS object. For example, if the client requests (by specifying in the min_QoS object) a data rate of 10 Mbps with a QoS performance of maximum packet loss of 0.1%, and these requirements cannot be fulfilled by any available QoS model, then the RESPONSE from the gatekeeper would contain an error code to communicate this and admission does not proceed.

Evidently, it is in the interest of the client to increase chances of admission by reducing the number of restrictions in the min_QoS objects and increasing the specification of desired parameters in the QoS_D object. This mapping of what features are desirable for which applications may be done on the client's side, for example by the client or a mapping device at the edge. Here, it is assumed that this has been done in a pre-defined manner, either per application or per-FEC (Forwarding Equivalence Class), where session-to-FEC mapping is also preconfigured.

The RESPONSE Message

Upon receiving the QUERY from the end client, the gatekeeper updates the QoS_A object with the relevant available models, including performance and other feature metrics/statistics that describe the models. This information is included as parameters in the respective QSPEC object.

While in examples described above, a feature is defined by a single metric, features may be specified in more complex ways. For example, a jitter model can have features relating to statistical variation of jitter in addition to the main jitter metric itself. An energy-usage model might have information about various bands of energy consumption and associated costs of choosing those bands (assuming that higher energy usage costs more). A resilience model might describe features relating to the distribution of resilience across the routes (i.e. distribution of mean time between failures across the various routes). Such additional feature information is optional but can simplify the task of the client in choosing their priorities and potentially having increased granularity in choosing their preferred QoS model.

QoS models and their features are represented in the QoS_A (and other) object(s) by distinct identifiers referred to as parameter IDs. The parameter IDs are chosen in any way. For example, each QoS model can be assigned a parameter ID and each feature within a QoS model can be assigned a different parameter ID, which can be derived from that of the QoS model itself or in any other way. If a parameter ID for a QoS feature is included in a message (e.g. in the RESERVE message) without a corresponding parameter ID for its associated QoS model then the gatekeeper considers the message invalid and returns an error code to communicate this.

In one approach, the QoS learning module may define, at the time of a single iteration of QoS model discovery, a custom set of parameter IDs associated with each of the descriptive parameters of a QoS model and update this information in a repository that can be accessed by the client to comprehend what the parameter values mean. Variations of this include grouping multiple parameters regularly reported for a given QoS model into a single parameter container to save parameter header overhead (in the protocol used, each parameter is defined with a parameter header, and a parameter container groups multiple parameters into a single structure with a single parameter header).

Regardless of the specific manner in which parameter IDs are assigned, (and assuming that QoS models are available meeting the minimum requirements) the generated RESPONSE message will include:
- a list of one or more models identified by their respective parameter IDs
- the definition of each model in terms of its features (e.g. performance metrics), each feature identified by reference to an assigned parameter ID and the relevant metric value(s) for the feature.

The gatekeeper may return all available QoS models that meet the min_QoS requirements. Alternatively, the gatekeeper may filter the list—e.g. if the number of available models exceeds some threshold. In one example, the QoS_D object (specifying the desired but non-mandatory QoS features) may be used to filter the QoS models, for example by selecting only models that meet both min_QoS and QoS_D feature requirements, or by selecting (from the models that meet min_QoS) a subset of models closest to the QoS_D feature requirements (e.g. determined by computing individual feature metric differences or vector distances between respective vectors of feature metrics).

The client can then process the available models to determine which are most suitable for the data flow in question. If the client has further queries regarding the received QoS_A object, it can proceed with another QUERY message to obtain more information. This is repeated either until a threshold number of requests or until the client is satisfied to proceed or abandon the request.

The operator can choose to subdivide a QoS model into granular bands of performance, with the available bands being published in the RESPONSE message as features of the model. The operator can choose not to release this information which implies that the client can only choose the QoS model but not the band of performance within this model. This gives the operator the chance to release information as much as desired rather than be forced to be completely transparent.

For example, a resilience model can be represented in the network as a tabulation of all the routes that are characterised to have a resilience of a certain value (represented by a function on a per device/link basis and subsequently aggregated over the route) at a certain granularity. Similarly, an energy-aware model can be represented as a tabulation of all the routes that are characterised as having energy consumption behaviour of a certain granularity (i.e. energy consumption 'bin'). The same applies to cost models as well. Therefore, the operator can choose to cluster these granular representations into any desired manner of larger groups of routes, all of which satisfy a defined range of softer behaviour. The same principle applies to performance-based routes as well (e.g. bands of packet delay performance could be advertised).

Note that it is possible for a client to choose, if bands of behaviour are described in the returned parameter list, a low performing band in order to optimise on other criteria that the client is not obligated to expose. For example, a client can opt for a low resilience model for a non-time critical traffic type and rely on TCP for re-transmission in the event of a failure in order to pay less for this type of traffic.

The RESERVE Message

Upon receipt of the RESPONSE message, the client can then select one or more QoS models to define the desired treatment for a data flow. Where more than one QoS model is selected, the RESPONSE message may additionally specify priority information prioritizing the selected models. The prioritization to be applied by the client may be hard-coded in advance or may be dynamically determined in any appropriate manner by the client system.

While the examples described here assumes that the client has the ability to prioritise the QoS models and respond with a RESERVE message indicating a preference, there may be clients that, although capable in NSLP signalling, do not have this capability to prioritise multiple QoS models. Such clients can instead respond with the same min_QoS message with no amendments in order to allow the network to determine whether the min_QoS can be facilitated anyway in any of the suitable QoS models without further constraints. In other words, in this case, the gatekeeper performs the model selection on behalf of the client. This allows backwards compatibility with a client that is not enhanced for this prioritisation task.

Assuming the client has established such a priority and has decided to proceed with the admission request, it may then generate a RESERVE message with QoS_D and min_QoS objects. The QoS_D object lists, using the parameter IDs corresponding to a QoS model in entirety, received in the preceding RESPONSE message, a list of QoS models in decreasing order of priority. The priority itself is signalled using the 4 reserved bits in each parameter sub-object in the QSPEC within the QoS_D object. It is also possible that a client specifies more than one QoS model at equal priority. For example, if the client desires to have a performance model of {jitter, loss, delay}={J1, L1, D1} with a tolerance specified in the min_QoS object of {jitter, loss, delay}={J2, L2, D2} where J2>J1, L2>L1 and D2>D1 as well as a route of high resilience for this traffic, it specifies the QoS model corresponding to the specific {jitter, loss, delay} combination (say, parameter ID 55) with the reserved bits set to 0000 and the QoS model corresponding to high resilience (say, parameter ID 60) with reserved bits set to 0000 as well, to specify equal importance for both these QoS models.

In this example, the priority field is interpreted such that an increase in the priority value signifies a decrease in priority. Thus a reserved bit sequence of 0000 is understood to be of higher priority to the client than a reserved bit sequence of 0001. However, any suitable representation can be used. Each QoS model is represented in the RESERVE message with its own parameter ID and priority unless two parameters have the same priority and can therefore be grouped into a single parameter container to save header overhead.

In some embodiments, in addition to identifying the QoS model(s) required for the data flow, the client may choose specific bands within QoS models as acceptable behaviour (e.g., specified in terms of upper and/or lower boundaries on one or more model feature metrics). For example, the client can choose a lowest cost model in addition to a performance model and apply limits on the highest cost that can be tolerated to satisfy the performance criteria. These limits will be communicated using parameter IDs that specify the specific feature within the QoS model (as returned by the RESPONSE message) together with the relevant boundary value(s). The min_QoS object is added if desired to specify absolute low boundaries of QoS treatment as well as to mandate certain QoS models. Such mandates would result in the request being turned down if the mandate cannot be met by the network in the current conditions.

The client has therefore expressed a priority of which QoS models they would like and some examples have been described so far. The gatekeeper now determines whether this request is admissible. The intelligence in making this decision, including deciding what to offer as well as to which routes the traffic must be distributed, is described in the next section. For completeness in signalling, we state here that the gatekeeper generates a RESPONSE message with an INFOSPEC object, communicating success in the admission process or the appropriate error code if admission has failed. If the reservation has succeeded, we propose that the gatekeeper generates a QoS_R object specifying what resources have been successfully reserved. This QoS_R object can also be used by the QoS learning module and other monitoring protocols to learn that reservation has been made and, if appropriate, that this bandwidth is now taken at ingress.

The gatekeeper also responds with a DSCP value to be used by the client for traffic classification of the data flow, and which serves as descriptor for the gatekeeper about how this traffic should be treated based on the outcome of this negotiation process. Note that the client may of course use the same negotiated CoS for multiple data flows, whilst negotiating other CoS for other data flows. Thus the negotiated QoS, as represented by the DSCP value, can be considered associated with a particular client session or FEC, with each session/FEC corresponding to one or more data flows that use the negotiated QoS.

The DSCP value is preferably generated by the gatekeeper (or assigned from a pool of available values) and linked to the specific negotiated CoS that it signifies. Note that, while the DSCP value could represent a single QoS model, it can also represent a more complex CoS, as it can relate to a combination of two or more of the initial list of published QoS models. This is the outcome of the negotiation between client and network which has allowed the client to obtain more granular QoS whilst still maintaining a sensible granularity in routing within the network (thus achieving some of the benefits of both IntServ and DiffServ). This individual DSCP value can be stored for a period of time and assigned to other traffic streams that fall within the same CoS classification following negotiation between the gatekeeper and the client. The gatekeeper also creates a mapping of FEC-to-tunnel in its Label Edge Router (LER) if MPLS tunnels are used for route maintenance or a FEC-to-sub-pool mapping within a tunnel if DS-TE is in use instead.

The DSCP value assigned to this session/FEC is returned in the <PHB_Class> parameter in the QoS_R object. This is read by the client and used to mark the data flow(s) that are to be treated in the negotiated manner.

Note that if a reservation fails, in some embodiments the client may be required to start again with a new session request. In such a case, the client can preferably skip the initial QUERY and RESPONSE and proceed to the RESERVE state if the client is assured that the network condition and offered QoS models have not changed during negotiation. If the INFOSPEC indicates that the request has failed to due unavailability of resources or change in QoS models, then the client instead sends a QUERY once again to ascertain the updated list of QoS models. Instead of starting a new session, alternatively, it is also possible that the client can attempt N number of times within the same session binding before they are prohibited from negotiating further for a period of time. Placing such a limit on the number of negotiations (which can be set to grow with the number of negotiation sessions as well) from a client reduces the likelihood of rogue clients sending numerous renegotiation requests in a Denial of Service attack.

Network Actions after Negotiation

The following sections describe the implications on the network once the negotiation is complete, including the allocation of routes to the data flows from the client. Additional features allowing both client and network to maintain influence over routing priorities are also described.

Route Identification from Priority List

It is the gatekeeper's task to determine, without exposing the network structure itself, whether the specific request in the RESERVE message can be admitted at the time it is made. For this, the gatekeeper uses the mappings that have been created by the QoS learning module which associate the QoS models with the routes that satisfy those models. Those mapping tables can also contain information quantifying the degree to which the route adheres to the model—more specifically, the extent to which the performance characteristics measured for data flows on the route adhere to the feature metrics of the QoS model. This could be indicated by metric differences specifying distance from the average feature vector for route-specific traffic of that QoS model to the cluster centre for the QoS model as a whole (i.e. the prototype discovered during clustering which represents the given cluster and hence QoS model), as route-specific confidence intervals (see e.g. "route confidence" column in FIG. 2D), or in any other suitable way.

Using the priority list returned in the RESERVE message, the gatekeeper determines the order of importance of routing models and performance bands within those models for the client.

Figures 4, 6:
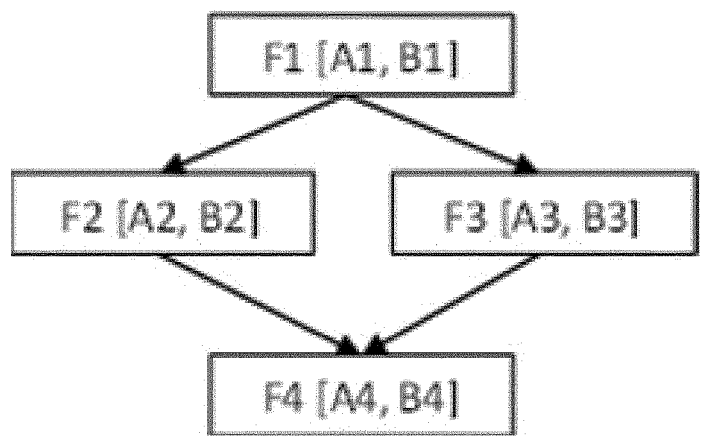
FIG. 4 illustrates a set of prioritised and parameterised QoS models.
FIG. 6 illustrates an example data set describing a set of QoS models.

FIG. 4 illustrates an example of a list of prioritised QoS models received from the client in the RESERVE message. In addition to a priority order, the QoS models are also parameterised with further constraints, represented by a QoS band within the model.

In FIG. 4, F1, F2, F3 and F4 are QoS models listed in priority order (F1 being highest priority, followed by F2, F3 at equal priority and F4 at lowest priority). [Ax, Bx] are optional boundaries of acceptable bands within the overall feature list where Bx and Ax are upper and lower bounds respectively. Instead of specifying bands, only upper or lower bounds could be specified (e.g. depending on the type of feature metric). Furthermore, the RESERVE message could specify bounds/bands on a single feature of the QoS model, on multiple features, or on all features of the QoS model (where the model is defined with multiple features).

As an example, F1 could correspond to a QoS model of {jitter, loss, delay}={0.2 ms, 0.1%, 20 ms}, F2 could be a resilience feature, F3 could be a cost-related feature and F4 could be an energy-related feature. [A1, B1] could correspond to adherence expected to F1 (in terms of one or more of its jitter, loss and delay features), [A2, B2] could correspond to acceptable minimum resilience, [A3, B3] could correspond to an upper bound of cost that the client is willing to pay for this session per unit time and [A4, F4] could correspond to a desired energy consumption band per unit time. It is also assumed that the gatekeeper is aware of the bandwidth requirements of the incoming flow, for example, from the Initiator QSPEC.

The gatekeeper identifies routes that can connect the client to the required destination of the data flow, and that have available bandwidth (note that if load balancing is used the routes need not have the full required bandwidth available as described in more detail later). The gatekeeper sorts the available routes according to the first priority which in this example is performance-related QoS model F1. The sorting is done in ascending order of feature metrics/bands (ascending order here means from lowest performance to highest performance; it should of course be noted that "high" performance may correspond to a low metric value and vice versa, as is the case for metrics such as packet delay or loss rate). The system then chooses the first route that offers the desired performance with the desired distance to the performance cluster centre. We propose in this example to assign traffic to the first route that offers above the minimum required performance rather than the best-available route. Alternatively, an operator could assign traffic to routes based on remaining bandwidth availability (i.e. routes with higher available bandwidths could be assigned traffic first). The operator can use any additional criteria in route filtering.

F2 and F3 are of equal priority to each other. From the selected route, models F2 and F3 and verified for conformity to the requested bands. This is done by looking up the routes that correspond to bands [A2, B2] and [A3, B3] in the respective route profile tables for QoS models F2 and F3 respectively. Therefore, there is no need for computation—the gatekeeper compares data flow statistics for the previously clustered routes to various performance bands to determine whether a given route conforms to a band in that QoS model. Note that the band specified in the RESERVE request can encompass more than one cluster centre. Evidently, the less restrictive the client is in their RESERVE request (min_QoS object) whilst being as descriptive as possible in what is desirable (QoS_D), the more choice of routes there are for the gatekeeper and the more likely it is that a flow is admitted.

If the test is passed, the route is evaluated for criteria F4 in the same way. A route that passes all tests is selected to map off the traffic from this request and the gatekeeper indicates the success back to the client to commence data transfer. If a route is found not to comply, the system then continues to consider the next available route from the original sorted list of available routes.

Alternatively, instead of selecting the first matching route, the system may continue to search for further routes that satisfy the prioritised QoS models, and if multiple such routes are found, then a selection can be made and/or multiple routes may be used for load balancing as described later.

Whilst the above example assumes that a route is identified matching all specified QoS models, the approach can be extended to consider routes that satisfy some QoS models at the desired band of performance but not others. In this case, the priority list preferably tells the gatekeeper which QoS models to sacrifice first. For example, in our example in FIG. 4, the client has indicated that routes must satisfy F1, F2 or F3 and F4 in that order of priority. A route must perform to the given QoS metrics of F1 after which is must either be resilient to the extent specified by [A2, B2] and/or cost within [A3, B3]. If the route satisfies F1 QoS metric performance as well as either resilience and/or cost limits, it is desired to be within a given energy consumption band.

Note that some of these priorities can have impacts on each other. For example, energy bands can be associated with cost and a less energy-efficient route can cost more. Therefore, the client must be sensible in setting these priorities or alternatively refrain from setting specific bands of performance as much as possible.

In one example, a route may be considered acceptable if it passes F2 and/or F3. A route that does not pass F4 is acceptable if the same route passes F1 and F2 and/or F3. A route is unacceptable if it does not pass F1, even if the other QoS models are passed. The gatekeeper can use this to trade-off QoS models against each other and perform the search accordingly. A route that satisfies F1 is searched for conformance to F2 or F3. A route that passes as many tests as possible is preferred. Therefore, if a route satisfies F1 and F4 but not F2/F3, this is preferred over a route that only passes F1. A route that only passes F1 can still be acceptable even if it does not pass any of the other tests, if there are no other options.

Alternatively, the number of tests to pass before a reservation is successful can be pre-defined, i.e. if two priority levels must be passed at a minimum rather than one, then a route that passes only F1 will still be rejected. It will be understood that a variety of approaches may be adopted in determining the exact manner in which the priorities provided are interpreted and used to constrain the available routes, and the present discussion merely provides particular examples of approaches for selecting a route in an agreed fashion between the client and the network. In another example, a mathematical score could be computed for each route based on its conformance with the specified QoS models and in accordance with the priorities associated with them, with the final route selection using the score.

Figure 5:
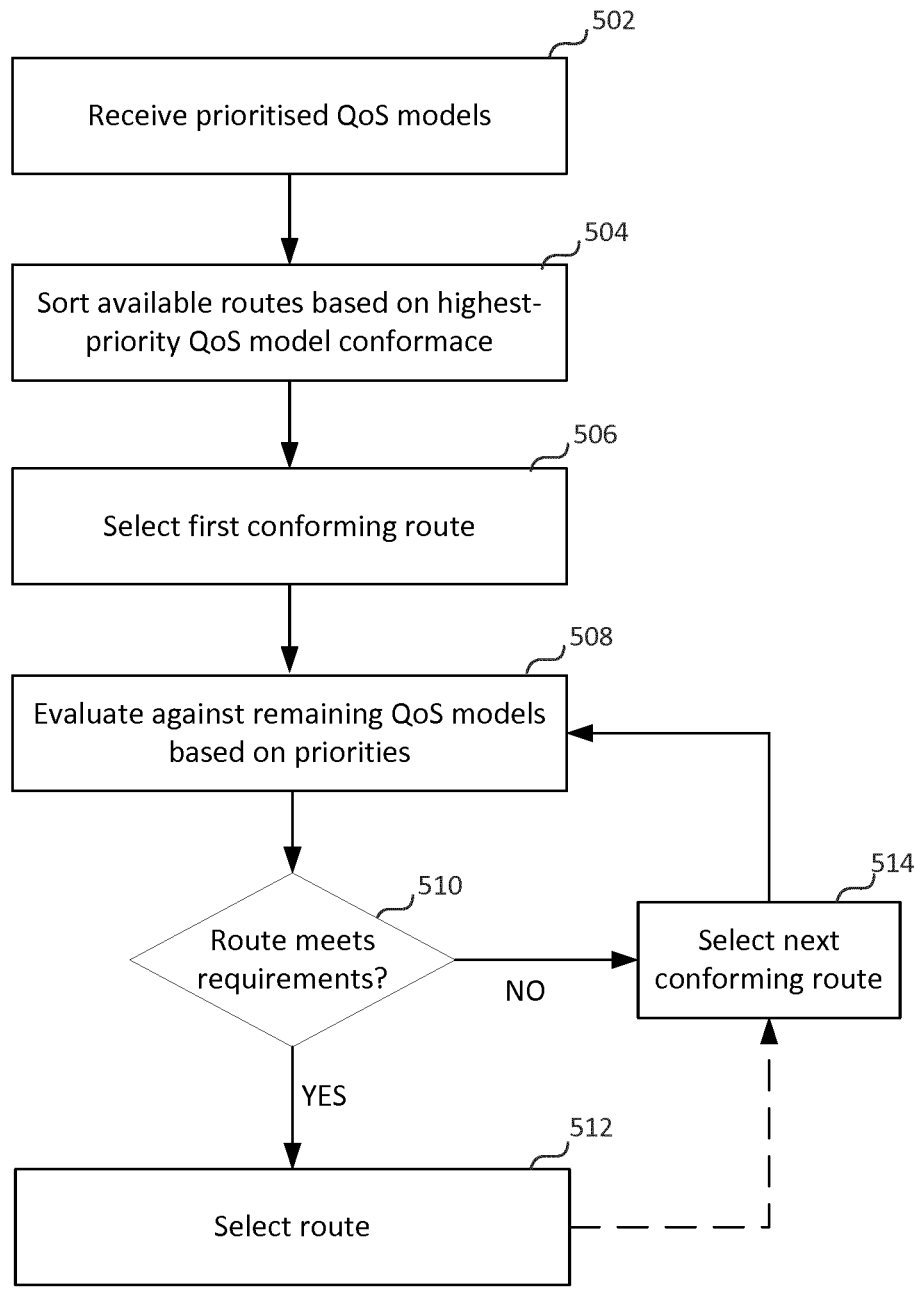
FIG. 5 illustrates a process for identifying routes corresponding to QoS requirements.

Prioritisation is summarised in overview in FIG. 5. As illustrated, the process starts with the receipt of the prioritised QoS models in the RESERVE message (step 502). In step 504, the routes available for the data flow are sorted based on their compliance with the highest-priority QoS model in order of compliance, and the first model is selected (step 506), this typically being the lowest-performance model that still meets the required level of performance (alternatively the best-performing model could be chosen first). In step 508, the route is evaluated against the remaining QoS models based on their respective priorities. If the route meets the requirements (check 510) then that route is selected for the data flow (or at least as a potential route) in step 512. If not, then the process identifies the next conforming route from the ordered routes in step 514 in accordance with the established order and continues to evaluation step 508. Optionally, even after a route has been selected in step 512, the process may continue to step 514 to repeat the loop and attempt to identify additional routes (e.g. for purposes of load sharing as discussed below).

As mentioned above, the exact process and rules applied in identifying matching routes based on the priorities of QoS models can be varied based on requirements. In preferred embodiments, routes that comply with higher-priority QoS models may be selected in preference to routes that comply with lower-priority QoS models, and/or routes that comply with a greater number of the specified QoS models may be selected in preference to routes that comply with fewer specified QoS models. The route must preferably comply with the highest-priority QoS model (or with a predetermined number of highest priority models). However, other approaches can be adopted.

Once a route has been selected for the session/data flow, bandwidth on that route is reserved. Since in preferred embodiments, routes are established (e.g. by creating tunnels) separately from (and in advance of) the QoS negotiation and flow admission process, no interaction within the network may be required at this point (such as LSP configuration, route reservation using RSVP, or the like). Instead, the gatekeeper may simply update route/tunnel configuration records to show that a given bandwidth quantity on a route has been consumed. Additionally, routing tables may be updated to associate the data flows with the route(s) assigned (e.g. mapping the assigned DSCP value to a specific route or tunnel). This may involve configuration at the gatekeeper itself and/or configuration at one or more network components, typically edge routers. After configuration, data flows arriving tagged with the DSCP value are then routed onto the assigned route.

Load Balancing Across Routes

It is also possible that a single route does not have sufficient bandwidth to support a session. It is possible that a collection of routes exist each of which satisfy the priorities in the same manner (or to different but acceptable degrees) but for smaller bandwidths. It is then proposed that the gatekeeper load balances between such routes. The selection can be done in a greedy manner such that the route with the highest available bandwidth is assigned as much as possible, following which the table is searched for the next route that performs sufficiently to assign the remaining portion.

It might be the case that subsequently selected routes perform better than the previous (but generally not worse to ensure overall QoS) for a given priority and therefore the upper band for a QoS model may be used to limit the search space, if desired.

Where multiple routes have been identified for load balancing purposes, bandwidth may be allocated to those routes for the data flow using any appropriate load balancing methodologies.

The greater the complexity built into the decision making stage of route allocation, the more time and resources may be consumed in making the decision. While potential options are proposed here to make the decision making more thorough, the trade-off between time taken to make a decision and the likelihood of a rejection due to lack of resources can be addressed in a particular implementation based on particular requirements. Here, it is proposed that the load balancing is only done between routes that have similar 'profiles' and performance within the requested bands [Ax, Bx] as end-to-end QoS may be less controllable when sending traffic over routes of a number of different QoS models. In this example, it is preferred that routes with performance less than the requested band are not chosen for load balancing as end-to-end QoS is less controllable in this instance as well.

Note that if a band [Ax, Bx] is not provided for a given selected QoS model, the gatekeeper is free to select any route complying with that QoS model. The gatekeeper can then choose to assign the best performing route for the chosen QoS model on a first come, first served basis. If a band [Ax, Bx] is provided, the route search is stopped when the first route that satisfies the upper bound Bx is found as described with respect to FIG. 4 (assuming the feature in question is one where a lower value is considered generally preferably to a higher value as is the case e.g. for latency, loss, cost, energy consumption etc.; for other feature metrics a high value may be preferable in which case the first route meeting the lower bound Ax could be chosen).

Note that if load balancing is performed, the gatekeeper preferably keeps a mapping of the scheduling at the head-end to enforce the load distribution. For example, if a 60-40 split is chosen across two routes L1 and L2, the head-end LER (e.g. edge router C1 or C3 in FIG. 1) maps 60% of the incoming traffic to the label corresponding to L1 and the remaining to L2.

Route Search Enhancement

Note that it is possible at this stage of the RESERVE message as well as the initial QUERY message that the client requests a QoS performance where one or more requested features cannot be mapped within existing bands of operation on the routes being searched. The network can then choose to propose the nearest band of operation using a distance computation and therefore determine which routes can offer the nearest possible performance to the requested QoS. This should act as a default catch-all condition which ensures that the negotiation does not enter a state where the network rejects a request without realising that it can support a band of operation that is slightly better or worse than that requested.

Operator Enforced Priority List

So far, we have described how the network can present a number of time-dependent QoS models and facilitate a QoS model priority system for routing based on a client's request. It is also possible that some QoS models are of more interest to the operator than the client.

For example, the client might not be concerned about the operator's energy costs. It may be possible to apportion additional cost to the traffic that shares a route based on energy consumption, to encourage clients not to choose traffic models that consume higher energy but this might be unfeasible if there are only a few clients on a route and the cost per client increases unreasonably. The client might choose a route with high energy consumption irrespective of cost given a different feature of higher priority and therefore the operator cannot necessarily enforce their own priorities into the routing model.

As a further example, it is also possible that there are other QoS models that the operator builds for internal use which it does not wish to make available for selection by the client.

Preferred embodiments allow such network operator priorities to be taken into consideration in the choice of routes once a client has conveyed their priority list by using a layered approach at the gatekeeper, without the client's knowledge or involvement.

This is achieved by providing a facility at the gatekeeper allowing the operator to reorganise the priority list returned in the RESERVE message including adding other priorities before the described analysis searches for routes satisfying those conditions. For example, if the operator finds that none of the clients choose an energy-efficient routing model, the gatekeeper can choose to insert the QoS model corresponding to energy-efficiency as the top n-th priority (reserved bits for first priority are 0000, second priority at 0001 etc.) and shift all the other priorities down by one level. The search for the best choice of routes remains unaltered but the operator's priorities have been incorporated into the process.

The operator can choose to set bounds if desired or not at all. If no upper bound is set, this means that when the sorting has taken place according to energy awareness, the entire table is searched for a suitable route that satisfies the client-requested priorities without rejecting a session for high energy usage. Therefore, if a route is found, it will be the most energy efficient one possible. If an upper energy bound is set, then routes that reside in bands above the upper bound will not be chosen even if they satisfy the client's priorities and the session will be rejected. Therefore, by not setting the upper bound, the operator can decide whether they would only like to optimise energy usage but continue to use high energy routes knowing that alternatives could not be found at the time of searching or actively discourage energy usage above a certain threshold in order to engineer the network to a certain energy consumption model.

More generally, the gatekeeper could not only add one or more QoS models, but could also delete one or more QoS models from the received list as well, as modifying received priority values for QoS models, with the FIG. 5 process then carried out based on the revised prioritised model list.

It is also possible that policies like energy usage are tied to the cost of a route, briefly mentioned above. In this instance, the bands of energy usage can be associated with pricing bands and incorporated into a dynamic pricing model. It is possible that such pricing information is communicated to the client in the QoS model returned by the initial RESPONSE QoS_A object from the gatekeeper (as one of the parameters associated with the energy model to be used by the client in deciding the priority list), or alternatively in the RESPONSE INFOSPEC object after reservation purely for the client's information.

Example Operation

The following described an example of the system in operation, demonstrating some of the features described previously.

FIG. 6 illustrates a set of QoS models that are currently available in an example scenario.

Note that each QoS model offers a number of different features, as shown in the table (note that for clarity the feature metrics for the features are not shown). In this example, model M1 offers features related to performance (jitter, loss, delay), model M2 and M3 offer performance-related features as well as softer policy-related features (e.g. energy and resilience), model M4 offers an energy-related feature and M5 is the only model that offers a cost-related feature.

Note that the models marked with an (*) contain additional information about the model itself (not shown in the table). For example, these may relate to bands of operation within "soft" models (e.g. cost, resilience) and confidence intervals relating to feature metrics in performance-related models, as described previously. Models that do not have (*) next to their model ID can be understood as unwilling to expose this additional information to a client in a RESPONSE.

Information about remaining throughput (bandwidth) for a given model may also be specified (last column). Assume also that the QoS models published here are not anticipated to be withdrawn in the short term and will be refreshed at the next iteration of the QoS learning module.

We assume that the negotiation described here takes place at admission control stage and that the gatekeeper described so far acts as the admission controller and bandwidth broker with enhanced intelligence in offering multiple QoS models, understanding a client's request including the priority list, finding a subset of routes that might satisfy this priority list if available and responding to the client with the relevant response—either a confirmation of admission along with an associated DSCP value or a rejection with a relevant error code.

The process starts with an incoming request from a client for a single session S1. The client has characterised this session in some form in the initial request message. It is assumed that this is done using NSIS signalling (QoS NSLP and GIST) and therefore takes the form of a probing QUERY message as discussed previously. It is possible that the client specifies a QoS_D object in this first QUERY message with a desired QoS behaviour and a min_QoS object. If a min_QoS object is specified, any feature also present in the QoS_D object can only be negotiated until the bounds specified in the min_QoS object have been reached. If resource is unavailable to satisfy min_QoS, the request is rejected straight away.

In this example, the QoS_D object specifies only a desired bandwidth of 10 Mbps and the min_QoS object mandates the maximum packet loss as 0.1%. The client might also specify a destination. The request thus includes one QoS_D feature and one min_QoS feature. It is also possible that there are other associated features in this Initiator QSPEC (such as bucket size, desired packet error ratio, maximum packet size, minimum packet size etc.) but we have chosen only bandwidth here to demonstrate the basic principle of QoS model selection. Further features in the Initiator QSPEC can be used to limit the list of returned QoS models in the same way.

The gatekeeper now determines which QoS models meet the min_QoS object. If no QoS model can satisfy this request, the admission stage fails. Assume that model M1 meets the min_QoS maximum packet loss requirement. If no other model can be shown to satisfy this requirement, only QoS model M1 can be returned in the response Ml. Alternatively, the network can check other routes for their forecasted packet loss rate and subsequently choose QoS models that are supported only by the routes that have the desired packet loss rate. Alternatively, routes that belong to model M1 can be searched for in other models M2-M6 and if the routes that are present in M1 that exhibit the desired packet loss rate (or better) are also present in other QoS models, then the other QoS models can be offered too. It is evident from this description that specifying a min_QoS object can restrict the options available for a client and therefore clients can only choose to send a QoS_D object for full negotiation options and highest likelihood of admission.

Assume that in this example, forecasted performance indicates that routes that belong to M1 are also present in M2, M4 and M5 whereas M3 cannot support the required minimum packet loss rate and therefore cannot be offered. However, only models M1, M4 and M5 can support the desired bandwidth and therefore M2 cannot be offered either.

This brief example describes how the initiator QSPEC can be used to discard models that will evidently not be suitable for the client request. We are now left with models M1, M4 and M5 which can be offered to the client as they have met the basic criteria. Note also that the operator might have a set of defined models that are offered irrespective of whether or not they meet the basic criteria. Assume that there are no such further models to be added to the list of M1, M4 and M5. Whilst it is possible that the destination filter reduces the number of QoS models available in other instances but given that all three models have the same source-destination pair in our example, M1, M4 and M5 still qualify as potential routing options.

Triggered by the QUERY message (which might obligate a response by setting the appropriate response-required bit in its initial QUERY message), the RESPONSE is generated from the network. This contains information about 3 models: M1, M4 and M5. Note that FIG. 2 contains (*) next to these models, which means additional information is available to be exposed in such a RESPONSE message. Note that if the example was constructed such that model M2 qualified, no such additional feature information will be supplied in the response, in which case, the client is free to query the response with another QUERY message for criteria the client application considers relevant. In such instances, either the network performs the query and returns the response in another RESPONSE message or a common trusted repository is made available using which clients can write their own queries.

In this example, however, all proposed model options contain additional information. In the case of model M1 this may, for example, include confidence interval information and band of operation/interval information. In the case of M4 and M5 which are both softer policy-related models (energy and cost respectively), this additional information may relate to bands of operation within the model itself. For example, additional information for M4 can specify that the available energy bands are within values E1 and E2, and for M5, this can relate to a minimum and maximum cost value that has been generated based on the 10 Mbps demand and taking into account current congestion etc.

Such information is preferably exposed in a concise form to the client, if the operator considers this to be appropriate. Such a concise form might involve a further layer of aggregation from the initial model database table. For example, if routes 1, 2 and 3 offer an energy performance of E1 and routes 4 and 5 offer an energy performance of E2, the set of routes 1, 2, 3, 4 and 5 collectively offer a band of operation E1-E2 as described above. Such aggregation of features can be used to control the granularity exposed to the client.

Note that once the QoS learning module has completed its task and the descriptions of the QoS models in terms of features have been determined, these feature values are represented as parameters in the RESPONSE message. We assume that the QoS model itself is represented by a parameter (and an associated ID) and the associated features for a QoS model can be represented as a different set of parameters each with their own IDs. Variations on this have been discussed above.

The RESPONSE from the gatekeeper will now contain parameters associated with M1, M4 and M5 along with the additional features associated with the respective models. This information is conveyed in the amended QoS_A message that was present in the QUERY. The QoS_A object conveys what is available and therefore is a suitable data structure to carry the required information back to the client.

Now the client has information about the three available models which it knows satisfy its min_QoS object. Note that the client might not have been aware of some of these models and therefore might choose to amend its reservation message in light of this information. The present example assumes that the client has the capability to interpret this RESPONSE and determine its priority list from the response received. It is possible that such interpretation is hard-coded and each application (e.g. corresponding to a particular session/FEC) has a pre-defined priority of features and is able to choose from this list taking into account the features offered at the time from the network as well.

We assume that the client has no further queries about the models themselves and has created its priority list as described in previously. For example, assume that the client wishes to have a performance model with a band of operation L1-L2 for loss, an energy efficient routing model that provides the required loss performance whilst simultaneously operating within a cost band of C1-C2. Assume that bands L1-L2 and C1-C2 are within the operational bands signalled by the network in its original RESPONSE message and therefore, there are routes that individually satisfy performance bands L1-L2 and cost band C1-C2. The energy efficiency requirement does not specify a band of operation and therefore this means that the client merely wants the best available set of routes within this model that meet the other criteria. The interaction between these three requirements is described below.

The client therefore constructs a RESERVE message with a QoS_D object. Following the common headers which specify that this message is addressed to the proxy (i.e. gatekeeper), the RESERVE message specifies, in its QoS_D QSPEC object, the parameter ID of M1 with the reserved bits set to 0000, followed by the parameter ID that specifies the additional feature (i.e. band of operation) and a value of L1-L2. This completes the client's specification for M1. This is then followed by the parameter ID of M4 with the reserved bits set to 0001. No further parameters are sent for M4 because the client does not wish to specify any additional features within this QoS model. Finally, the client appends the parameter ID that corresponds to M5 with reserved bits set to 0010 along with the next set of parameters that specify the desired band of operation within M5 (C1-C2). Note that some of these parameters can be combined into containers in order to save overheads. Note also that the desired bands of operation can also be stacked within a QoS model as well. This extension can be used to signal preferences within models such as M2 and M3 which offer SLAs on more than one feature. The client also specifies information about bandwidth requirements in addition to other data features such as bucket size etc. which can be used for policing by other applications.

Note that we have assumed a linear priority list in our example. Alternatives include lists where multiple features are requested at the same level of priority, in which case, we choose to interpret this as an AND/OR between the two features, as described previously. It is assumed here that a minimum of one priority level must be satisfied for the reservation to proceed. This means that the performance loss requirement must be satisfied at the minimum as this is the most important priority in the RESERVE message.

Note that we also assume that the gatekeeper has been enabled to verify that a parameter (i.e. feature) is only interpreted if the QoS model associated with the parameter is also specified in the same message in the priority list in the correct order (following the parameter that corresponds to the QoS model itself). Therefore, parameters that appear in the RESERVE message that are not preceded by their corresponding QoS models are ignored and/or reported back to the client.

The gatekeeper now determines if the specified priority list can be satisfied within the desired bands of operation. This is done from the information contained in the model-route mapping table as described earlier. In order to do this, the routes associated with model M1 are sorted in ascending order. The first route that qualifies for performance within bands L1-L2 is chosen. It is determined if the route is also present in the route list for energy optimisation. If this is the case, the same route is searched for in the route list for cost. If the given route satisfied all three requirements, the search is successful.

Note that routes are searched in ascending order of performance within the QoS model and it is proposed that a route only needs to be above (or meet) the minimum bound of performance for it to qualify for allocation to the data flow (regardless of how the performance metric is represented numerically; e.g. for packet delay a lower value represents higher performance). It is only if the route that satisfies the minimum bound is unable to support the other constraints that the next route of better performance is evaluated. Alternatively, other methods of choosing a subset of routes from the available pool can be implemented (i.e. from best performance to worst, on first-come-first-served basis, based on remaining available bandwidth, stability etc.).

Alternatively, it is possible that all routes that satisfy the desired loss performance within L1-L2 do not satisfy the cost criteria. Note that since the client has not explicitly specified an energy band of operation, this is unlikely to be a limiting factor in the search for possible routes. Any route that is chosen will be the most optimum route for energy performance but the lack of an upper bound means that all routes will be evaluated and the chosen route will be the most energy-efficient one possible taking into account the other two constraints. Note that the cost criterion is evaluated only for routes that satisfy the performance criterion first. This is the explicit result of the priority list.

If the client has specified a cost band in a min_QoS object, then a reservation will result in a rejection if none of the routes that satisfy the desired loss performance satisfy the cost band of operation. Since in this example, the three QoS models are only expressed in a QoS_D object, a route can still be found if it satisfies the desired loss performance but not the cost band.

The purpose of the priority-guided search is to determine whether or not there is a subset of routes that satisfy the specific sequence of priorities from the client. This can be understood better once it is realised that each QoS model is only optimised for a small set of variables. For example, one QoS model can be optimised for performance against a given {jitter, loss, delay} vector whilst another QoS model can be optimised for energy efficiency only. This means that as we proceed down the list of the first QoS model, we find routes that adhere less and less to the target prototype and similarly as we proceed down the list of routes that support the second QoS model, we find routes that become increasingly energy consuming. Therefore, if a client requests for a route that is both QoS-driven as well as energy-efficient, the network must search if such a route (or set of routes) exists. It is possible that 5 routes (R11, R21, R31, R41, R51) exist satisfying the first QoS model and indeed the required performance band within the model (e.g. within L1-L2 above) and 3 routes (R11, R21, R61) exist satisfying the second. However, only two of these (R11 and R21) satisfy both performance as well as energy utilisation within the specified band. The task of the gatekeeper is to find these two routes R11 and R21 in order to be able to admit the session onto these two routes.

It is also possible that when a higher dimensioned set of QoS models are published, lower dimensions of this QoS model can be found in the same way based on client requests for the lower dimensions. For example, if a prototype exists for {jitter, loss, delay}={J1, L1, D1} but a client only requests a delay performance of D1, then routes that only satisfy D1 can be determined in the same way and this avoids the network having to enumerate and publish all lower dimensions of a given higher dimensional QoS model and instead search for routes that satisfy the lower dimensions when the request arrives.

Assume that the search from the model-route mapping table in this example produces two routes, R1 and R2, which satisfy one or more of the required criteria (loss-related performance, energy efficiency and cost). The gatekeeper can now go ahead with admitting the session, by allocating the data flow to the identified route(s) and reserving bandwidth on those routes.

In a preferred approach, the gatekeeper stores a record of this negotiation having taken place and registers the negotiation result of agreed QoS features against a locally generated DSCP value. Generation of the DSCP value was described previously. The DSCP value can then be retained by the gatekeeper locally for a period of time to map other incoming service requests to the same route(s) for the same QoS features.

Thus, the system may generate a locally-significant DSCP value that maps incoming traffic from S1 onto routes R1 and R2. The purpose of the DSCP value is to serve as a quick look-up for a network to recall the negotiation that might have preceded the assignment of the value to the session. Alternatively, if the network is able to recall state in another fashion, i.e. using message and/or session binding in QoS NSLP or in some other way, then a local DSCP value need not be generated and state can be maintained in another fashion. The DSCP value is preferably only used between the client and network to signify the negotiated QoS features so that the network can map the tailored QoS model to the less granular set of routes in the network to satisfy the agreed QoS model. If message/session binding is used, the gatekeeper preferably still registers that the two routes R1 and R2 are associated with the generated session/message ID.

Assume that our example chooses to assign a DSCP value that the gatekeeper updates in the Label Edge Router (LER) (e.g. one of the edge routers C1-C4 shown in FIG. 1) so that the first hop for packets marked with this code point is either onto routes (e.g. tunnels) R1 or R2. The method used by the gatekeeper to apportion the traffic across R1 and R2 can involve load balancing as described above. This will be relevant if no route is available to satisfy the 10 Mbps throughput and therefore multiple routes are chosen to distribute the traffic, if appropriate, where each of these chosen routes satisfies the priority list.

At this point, the system has determined, based on the client's request, a set of routes onto which S1 is mapped. The LER is updated with the associated DSCP values so that label switching can take place at ingress for S1. The client is signalled with a RESPONSE including an INFOSPEC as well as a QoS_R message indicating reserved resources. The associated DSCP value can be signalled in the <PHB_Class> parameter and hence used by the client for S1 traffic. If a network interface is used between the client and the gatekeeper, this mapping can be done at this interface instead. The INFOSPEC can also contain error messages, if necessary. This is especially useful if admission was not successful and the client can use the final RESPONSE to troubleshoot and re-negotiate.

The client may be required to start again with a new session request if an admission process fails with a maximum threshold set on the number of times a client is allowed to negotiate in a given time period.

After reserving bandwidth on the allocated routes, the remaining available bandwidths are updated for each model used by S1 once the session commences (see FIG. 6). Session mapping information is also updated.

It is also possible that the network chooses to inject its own priorities before the search for the set of routes is undertaken. This is done by altering the priority list received from the client e.g. to add a QoS model that corresponds to the operator-desired feature along with performance bands of operation within this model. For example, if the network chooses to inject a resilience-related feature as the first priority, it does so by amending the RESERVE QSPEC received. The parameter that corresponds to resilience is introduced before the parameter for model M1 and any desired bands of operation within resilience (e.g. probability of route failure must be within P1-P2) are specified as additional features in the same way bands of operation were specified by the client. This amendment results in the search first looking for routes of resilience within the specified probability band and subsequently searching for routes that offer the required loss performance within this subset of routes. If the operator does not specify the band of operation, it means that the search will prioritise resilience over other features but will not reject a route based on resilience performance. The operator can be assured that the chosen route(s), should the request be successfully admitted, will be the most resilient possible whilst still satisfying the clients' priorities. If the route resilience is actually poor, it only means that no routes of higher resilience were found to satisfy the other criteria and therefore the best possible resilient route was chosen.

System Architecture

Figure 7:
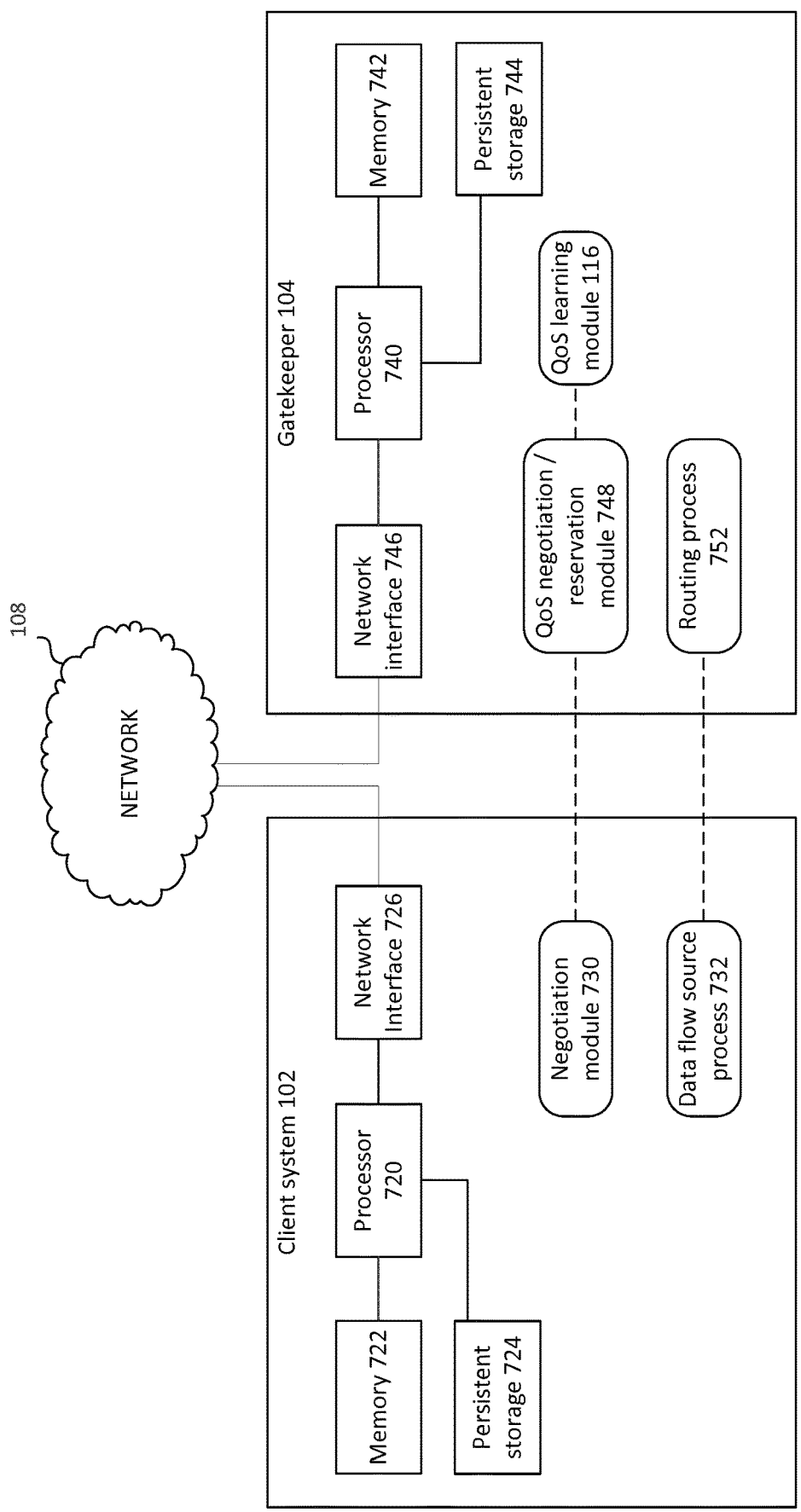
FIG. 7 illustrates hardware/software architectures for components of the system.

FIG. 7 illustrates by way of example a possible hardware and software architecture of the client and gatekeeper components of the system.

The client system 102 (e.g. a server originating a data flow that is to be transmitted across the network) includes one or more processors 720 together with volatile/random access memory 722 for storing temporary data and software code being executed. A network interface 726 is provided for communication with other system components (including gatekeeper 104) over one or more networks 108 (e.g. Local or Wide Area Networks, including the Internet).

Persistent storage 724 (e.g. in the form of hard disk storage, optical storage, solid state storage and the like) persistently stores software for implementing the methods described previously, including a negotiation module 730 for participating in the QoS negotiation process and a data flow source process 732 for generating and/or forwarding the data flow that is to be subject to the negotiated QoS. The persistent storage also includes other typical server software and data (not shown), such as a server operating system.

The client system 102 may include other conventional hardware components as known to those skilled in the art (e.g. I/O devices), and the components are interconnected by a data bus (this may in practice consist of several distinct buses such as a memory bus and I/O bus).

The Gatekeeper 104 may comprise conventional server hardware, including memory 742 and persistent storage media 744 (e.g. magnetic/optical/solid state disk storage), both for storing computer-executable software code and data, one or more processors 740 for executing software and a network interface 746 for communication with external networks 108.

The processor runs software modules including the QoS learning module 116 which implements the learning algorithms for dynamically discovering QoS models based on monitored data flow statistics, and creates a database of QoS models and model-to-route mappings for storage e.g. in memory 742 and/or persistent storage 744.

The processor 740 further runs a QoS negotiation/reservation module 748 for implementing the gatekeeper's negotiation and reservation functions, based on the QoS model information and route information stored in persistent storage 744 and/or memory 742. The negotiation module 748 communicates with the corresponding module 730 at client system 102 via the network to implement the described negotiation protocol.

In the case that the gatekeeper additionally performs traffic forwarding, the gatekeeper may also run routing process 752 for routing traffic tagged with a given negotiated QoS that is received from the client system (in particular data flow source process 732) onto assigned routes and performing load balancing and the like. Alternatively, traffic routing based on the negotiated QoS could be performed at external routing devices (e.g. the edge routers of FIG. 1).

The persistent storage also includes other typical server software and data (not shown), such as a server operating system. The gatekeeper 104 may include other conventional hardware components, with components interconnected via a bus, as described for client system 102. Note that where the gatekeeper implements routing functions, other conventional router software and hardware may be included, such as a set of interconnected line interface cards and a router operating system.

While a specific architecture is shown by way of example, any appropriate hardware/software architecture may be employed for components 102 and 104.

Furthermore, functional components indicated as separate may be combined and vice versa. For example, while negotiation module 730 and data flow source process 732 are shown as implemented in a single system 102, in practice these functions could be separated, for example with the client system 102 performing the negotiation on behalf of another system or device that originates and transmits the data flow (such as a media server in a media streaming application). Similarly, with regard to the gatekeeper 104, the QoS learning module 116 may be implemented in a physically separate device from the QoS negotiation module 748. More generally, the functions of components 102 and 104 may in practice be distributed across any number of separate computing devices in any appropriate fashion.

The various methods and software elements described throughout this description are preferably provided in the form of computer-executable software code embodied in one or more tangible computer-readable storage media that may be executed by client system 102, gatekeeper 104, or any other appropriate devices.

It will be understood that the present invention has been described above purely by way of example, and modification of detail can be made within the scope of the invention.

The invention claimed is:

1. A method of allocating resources in a network for the transmission of a data flow, comprising:
    receiving a query specifying one or more quality-of-service (QoS) requirements for the data flow;
    identifying, based on the specified QoS requirements, one or more QoS models from a set of stored QoS models, each QoS model defining a class of service available in the network;
    transmitting, in response to the query, a query response specifying the identified QoS models;
    receiving a reservation request, the reservation request specifying at least one of the identified QoS models; and
    allocating one or more resources in the network for the data flow based on the at least one QoS model specified in the reservation request by identifying one or more network routes for transmission of the data flow, and allocating a portion of bandwidth on the identified route(s) to the data flow.

2. A method according to claim 1, wherein the identifying step comprises selecting at least one QoS model having QoS features meeting at least one of the QoS requirements.

3. A method according to claim 2, wherein the query specifies one or both of:
    a first set of one or more QoS requirements indicated as mandatory for the data flow; and
    a second set of one or more QoS requirements indicated as desirable but non-mandatory;

and wherein the method comprises selecting one or more of the stored QoS models that are compliant at least with each of the specified mandatory QoS requirements.

4. A method according to claim 1, comprising, after transmitting the query response, receiving one or more further queries including modified QoS requirements in relation to the data flow, and repeating the identifying and transmitting steps for the or each further query.

5. A method according to claim 1, wherein allocating resources comprises allocating a class of service to the data flow, the class of service associated with a set of one or more QoS features selected in dependence on the QoS features of the QoS models specified in the reservation request.

6. A method according to claim 5, wherein the allocated class of service corresponds to one of the specified QoS models or a combination of a plurality of the specified QoS models.

7. A method according to claim 1, comprising generating a class of service identifier identifying a class of service for the data flow, the class of service identifier being included in a reservation response.

8. A method according to claim 7, wherein the class of service identifier comprises a Differentiated Services Code Point value.

9. A method according to claim 1, wherein allocating resources comprising selecting for transmission of the data flow at least one network route supporting data transmission in accordance with one or more of the QoS models specified in the reservation request.

10. A method according to claim 1, wherein the reservation request specifies a plurality of selected QoS models, and includes priority information indicating respective priorities for one or more of the selected QoS models, wherein the priority information indicates a priority order for the specified QoS models.

11. A method according to claim 10, wherein the one or more resources in the network are allocated in accordance with the priority information including the priority order.

12. A method according to claim 1, comprising, after receipt of the reservation request, modifying the set of QoS models specified in the request, the allocating step performed based on the modified set of QoS models.

13. A method according to claim 1, comprising:
allocating a first route for the data flow based on one or more QoS models specified in the reservation request;
determining an available bandwidth of the first route;
determining a bandwidth requirement for the reservation request; and
in response to determining that the available bandwidth is less than the bandwidth requirement, allocating at least one further route for the data flow based on the one or more QoS models specified in the reservation request.

14. A method according to claim 1, performed at a first computer system and wherein the query and reservation request are received at the first computer system from a second computer system and the query response is sent from the first computer system to the second computer system, the method further comprising, at the second computer system:
receiving the query response;
selecting one or more of the identified QoS models;
generating the reservation request specifying the selected QoS models; and
transmitting the reservation request to the first computer system.

15. A method according to claim 14, wherein a reservation response is sent from the first computer system to the second computer system, and the method further comprises, at the second computer system:
generating priority information associated with the one or more selected QoS models;
generating the reservation request specifying the priority information in addition to specifying the selected QoS models; and
transmitting the reservation request to the first computer system.

16. A non-transitory computer readable storage medium comprising software code adapted, when executed on a data processing apparatus, to perform a method as set out in claim 1.

17. A system comprising:
at least one processor and associated memory storing instructions that are executable by the processor such that the system is configured to:
receive a query specifying one or more quality-of-service (QoS) requirements for the data flow;
identify, based on the specified QoS requirements, one or more QoS models from a set of stored QoS models, each QoS model defining a class of service available in the network;
transmit, in response to the query, a query response specifying the identified QoS models;
receive a reservation request, the reservation request specifying at least one of the identified QoS models; and
allocate one or more resources in the network for the data flow based on the at least one QoS model specified in the reservation request by identifying one or more network routes for transmission of the data flow, and allocate a portion of bandwidth on the identified route(s) to the data flow.

18. A system according to claim 17, wherein:
the reservation request specifies a plurality of selected QoS models, and includes priority information indicating respective priorities for one or more of the selected QoS models; and
the priority information indicates a priority order for the specified QoS models; and
the one or more resources in the network are allocated in accordance in accordance with the priority information including the priority order.

19. A method of allocating resources in a network for the transmission of a data flow, comprising:
receiving a query specifying one or more quality-of-service (QoS) requirements for the data flow;
identifying, based on the specified QoS requirements, one or more QoS models from a set of stored QoS models, each QoS model defining a class of service available in the network;
transmitting, in response to the query, a query response specifying the identified QoS models;
receiving a reservation request, the reservation request specifying at least one of the identified QoS models; and
allocating one or more resources in the network for the data flow based on the at least one QoS model specified in the reservation request;
wherein the method is performed at a first computer system and wherein the query and reservation request are received at the first computer system from a second computer system and the query response is sent from the first computer system to the second computer system, the method further comprising, at the second computer system:

receiving the query response;

selecting one or more of the identified QoS models;

generating the reservation request specifying the selected QoS models; and transmitting the reservation request to the first computer system.

20. A method according to claim 19, wherein a reservation response is sent from the first computer system to the second computer system, and the method further comprises, at the second computer system:

generating priority information associated with the one or more selected QoS models;

generating the reservation request specifying the priority information in addition to specifying the selected QoS models; and transmitting the reservation request to the first computer system.

21. A system comprising:

at least one processor and associated memory storing instructions that are executable by the processor such that the system is configured to:

receive a query specifying one or more quality-of-service (QoS) requirements for the data flow;

identify, based on the specified QoS requirements, one or more QoS models from a set of stored QoS models, each QoS model defining a class of service available in the network;

transmit, in response to the query, a query response specifying the identified QoS models;

receive a reservation request, the reservation request specifying at least one of the identified QoS models; and allocate one or more resources in the network for the data flow based on the at least one QoS model specified in the reservation request, wherein the reservation request specifies a plurality of selected QoS models, and includes priority information indicating respective priorities for one or more of the selected QoS models;

the priority information indicates a priority order for the specified QoS models; and the one or more resources in the network are allocated in accordance in accordance with the priority information including the priority order.

* * * * *